United States Patent
Newman

(10) Patent No.: US 10,481,279 B1
(45) Date of Patent: Nov. 19, 2019

(54) STAGGERED DETECTOR ARRAY FOR LOCATING RADIOACTIVE SOURCES

(71) Applicant: David Edward Newman, Poway, CA (US)

(72) Inventor: David Edward Newman, Poway, CA (US)

( * ) Notice: Subject to any disclaimer, the term of this patent is extended or adjusted under 35 U.S.C. 154(b) by 0 days.

(21) Appl. No.: 16/226,618

(22) Filed: Dec. 19, 2018

Related U.S. Application Data

(63) Continuation of application No. 16/147,794, filed on Sep. 30, 2018, now Pat. No. 10,191,160.

(60) Provisional application No. 62/725,871, filed on Aug. 31, 2018.

(51) Int. Cl.
| | |
|---|---|
| *G01T 1/20* | (2006.01) |
| *G01T 3/00* | (2006.01) |
| *G01T 3/06* | (2006.01) |
| *G01V 5/00* | (2006.01) |
| *G01T 1/29* | (2006.01) |

(52) U.S. Cl.
CPC .................. *G01T 1/20* (2013.01); *G01T 1/29* (2013.01); *G01T 3/00* (2013.01); *G01T 3/06* (2013.01); *G01V 5/0008* (2013.01); *G01V 5/0075* (2013.01)

(58) Field of Classification Search
CPC .... G01T 1/20; G01T 3/00; G01T 3/06; G01V 5/0008
See application file for complete search history.

(56) References Cited

U.S. PATENT DOCUMENTS

| | | |
|---|---|---|
| 4,037,105 A | 7/1977 | Laurer |
| 5,880,469 A | 3/1999 | Miller |
| 6,392,236 B1 | 5/2002 | Maekawa |
| 6,566,657 B2 | 5/2003 | Odom |
| 7,745,800 B1 | 6/2010 | McGinnis |
| 8,030,617 B2 | 10/2011 | Enghardt |
| 8,143,586 B2 | 3/2012 | Inbar |
| 9,733,367 B1 | 8/2017 | Derzon |
| 9,958,561 B2 | 5/2018 | Bellinger |
| 2008/0191140 A1 | 8/2008 | McDevitt |
| 2009/0166549 A1 | 7/2009 | Czirr |
| 2010/0090115 A1 | 4/2010 | Lerch |
| 2010/0258734 A1 | 10/2010 | McCormick |
| 2015/0301203 A1 | 10/2015 | Lennert |
| 2018/0136344 A1 | 5/2018 | Nelson |
| 2018/0172849 A1* | 6/2018 | Nelson ............... G01N 23/2255 |

* cited by examiner

*Primary Examiner* — Mark R Gaworecki

(57) ABSTRACT

A large-area directional radiation detection system may include a large number of slab-shaped detectors stacked side-by-side and alternately displaced frontward and rearward, thereby providing a longitudinally-staggered array of protruding and recessed detectors. The protruding detectors collimate or restrict the lateral field of view of the recessed detectors, thereby enabling the angular position and distance of a source to be determined. The high detection efficiency and large solid angle of the staggered detector array enable rapid detection of even well-shielded threat sources at substantial distances, while simultaneously determining the positions of any sources detected. This detector array will be essential for guarding against clandestine delivery of nuclear materials in the coming century.

19 Claims, 20 Drawing Sheets

STAGGERED DETECTOR ARRAY FOR LOCATING RADIOACTIVE SOURCES

CROSS REFERENCE TO RELATED APPLICATIONS

This application is a continuation of U.S. patent application Ser. No. 15/147,794 filed on Sep. 30, 2018, which claims the benefit of U.S. Provisional Patent Application No. 62/725,871 filed on Aug. 31, 2018, the entire disclosures of which are incorporated by reference as part of the specification of this application.

FIELD OF THE INVENTION

The present invention relates generally to detecting a radiation source. More particularly, the present invention is directed in one exemplary aspect to a large-area directional radiation detection system that determines the location of the radiation source.

BACKGROUND

A nuclear weapon is difficult to detect, particularly if it is shielded and hidden among cargo. Depending on the shield design, some radiation, notably gamma rays and neutrons, can leak out. In addition, the amount of time available for an inspection of vehicles and cargo, at an entry port for example, is generally limited to a short period such as one minute so as to not delay the flow of commerce. Unless the threat is emitting a large amount of radiation, the scan may fail to detect the threat in the available inspection time.

If a weapon successfully evades an initial radiation inspection, an adversary can then emplace it in an urban environment or a government center or near a military base, and use it for unlimited extortion or a future attack. Detecting and localizing such a hidden weapon would require a system capable of separating source particles from backgrounds as well as localizing the weapon spatially. Large-area detectors are necessary to intercept a sufficient fraction of the emitted radiation, and advanced designs are needed for directionality.

What is needed, then, is an advanced large-area detector system, capable of detecting gamma rays or neutrons or both, with sufficient detection efficiency to reveal even a very well-shielded nuclear weapon. Preferably the new system should also indicate the position of the weapon, despite clutter and backgrounds and active obfuscation, in a practical scan time, and preferably at minimal cost.

SUMMARY

Disclosed herein is a detector array for detecting and locating a radioactive source. In one embodiment, the detector array includes at least twenty slab-shaped detectors configured to detect particles from the radioactive source, each detector being positioned parallel to an aiming plane that runs centrally from the back to the front of the detector array, wherein said at least twenty slab-shaped detectors are stacked face-to-face, wherein said at least twenty slab-shaped detectors are arranged in an alternating sequence of frontward and rearward detectors, and wherein each rearward detector is offset from one or more adjacent frontward detectors by a distance of 1 to 3 times the thickness of each of said at least twenty slab-shaped detectors, and wherein the thickness of each of said at least twenty slab-shaped detectors is 1 to 3 times the average interaction distance of the particles therein, and a processor configured to be communicatively coupled to said at least twenty slab-shaped detectors and further configured to determine a front-versus-back position of the radioactive source by comparing a frontward detection peak associated with the frontward detectors with a rearward detection peak associated with the rearward detectors.

These and other embodiments are described in further detail with reference to the figures and accompanying detailed description as provided below.

DETAILED DESCRIPTION OF INVENTION

Figure 1:
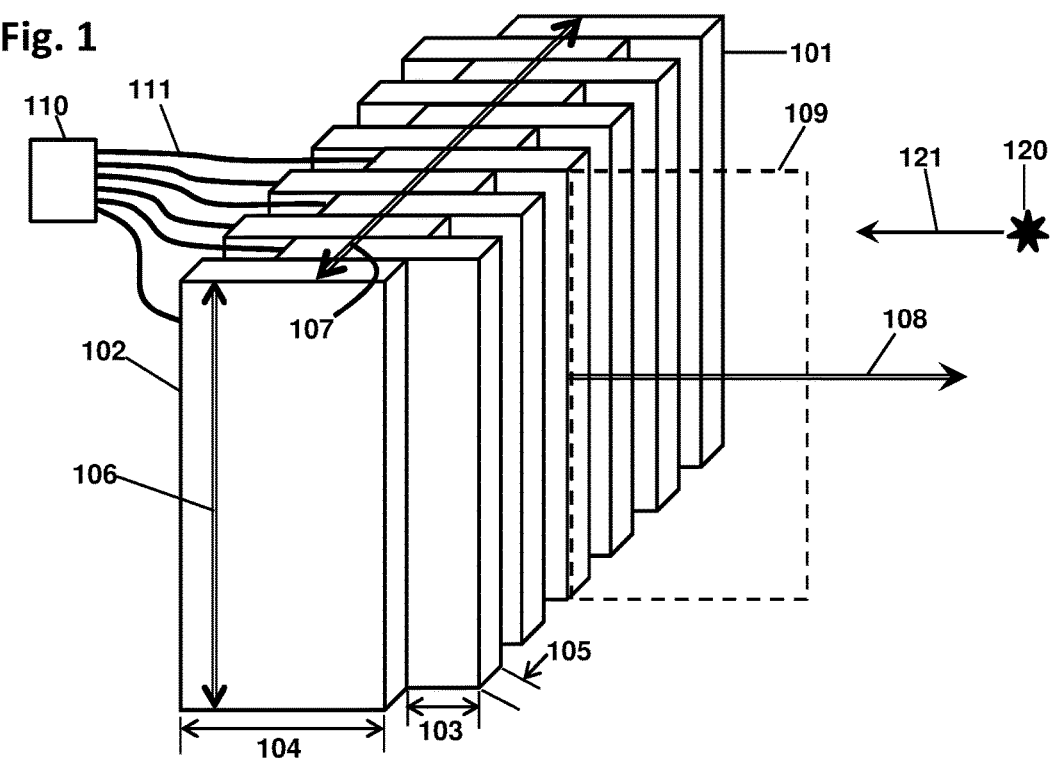
FIG. 1 is a sketch in perspective of an exemplary detector array including an array of protruding and recessed detectors in alternation, according to some embodiments.

In the following description, reference is made to the accompanying drawings in which it is shown by way of illustration specific embodiments in which the invention can be practiced. Not all of the described components are necessarily drawn to scale in order to emphasize certain features and to better facilitate the reader's conception of the disclosed embodiments. It is to be understood that other embodiments can be used and structural changes can be made without departing from the scope of the embodiments of disclosed herein.

Disclosed herein is an array of detectors (the "detector array") for detection and localization of nuclear and radiological weapons and their radioactive components, as well as any other radiation sources that are to be located. In some embodiments, the detector array may include slab-shaped detectors stacked adjacently face-to-face, with each detector being configured to detect gamma rays or neutrons (the "particles") from the source and thereby emit signals such as electrical pulses. In some embodiments, the detector array includes no shields or collimators. The detectors may include two interleaved sets of detectors. The two sets may be termed the "frontward" and "rearward" detectors being displaced relatively toward the front and back of the detector array, respectively. When a source is present, the detectors may be termed the "protruding" and "recessed" detectors according to their position protruding toward the source or recessed away from the source respectively. Thus the "protruding detectors" are positioned longitudinally toward the source and "recessed detectors" are positioned longitudinally farther from the source relative to the protruding detectors. The "recess distance" is the longitudinal offset distance between the frontward and rearward detectors, or equivalently, the distance that the recessed detectors are displaced relative to the protruding detectors. The protruding and recessed detectors may be interleaved, or positioned alternately in succession, thereby forming a wall-like assembly of longitudinally staggered detectors which are alternately displaced toward the source and away from the source in succession.

As used herein, the "source location" refers to spatial location parameters of the source including, without limitation, the front-versus-back position of the source, the distance of the source from the detector array, the angle of the source relative to the detector array, and/or a lateral position of the source relative to the detector array. As used herein, the "lateral" direction is perpendicular to the major surfaces of the detector slabs, the "longitudinal" direction is parallel to the major surfaces of the detector slabs and parallel to the offset between the frontward and rearward detectors, and the "height" direction is parallel to the major surfaces of the detector slabs, perpendicular to the longitudinal direction, and perpendicular to the lateral direction. A "detection peak" is a group of detectors that have enhanced detection rates, and may be a "recessed detection peak" or a "protruding detection peak" depending on which type of detectors exhibit the detection peak. "Secondaries", or secondary particles, are charged particles generated by interactions of the source particles, such as Compton electrons and photoelectrons and electron-positron pairs from gamma ray interactions, alpha particles and tritons from neutron-capture reactions, and recoil protons and recoil ions from neutron-scattering interactions.

An "aiming plane" is a centrally and symmetrically positioned plane which is parallel to the longitudinal direction, parallel to the height direction, and perpendicular to the lateral direction. The central detector slab in the array is parallel to the aiming plane. The "source angle" is the angle between the aiming plane and a vector from the center of the detector array to the source. The "lateral position" of the source is the distance from the aiming plane to the source in the lateral direction.

Particles arriving from the source may be detected in the protruding detectors and/or the recessed detectors. The protruding detectors may act as collimators by blocking particles at various angles from reaching the recessed detectors, and thereby restrict the lateral field of view of the recessed detectors. Consequently, the distribution of detections in the recessed detectors generally exhibits a narrow detection peak, which is relatively narrow due to the restricted field of view. The protruding detectors, on the other hand, may be unobstructed in their view of the source, and therefore exhibit a much broader detection peak according to the geometrical area of each protruding detector as viewed by the source. The processor can determine whether the source is in front or behind the detector array, and thereby determine which set of detectors is protruding and which is recessed, according to which set of detectors has the wider or narrower detection peak. More specifically, the processor may be communicatively connected to each of the detectors so as to receive signals such as electrical pulses that indicate when each particle detection event occurs in each detector. Such communicative coupling may comprise, for example, cables connecting each detector to the processor. The processor may analyze the signals and thereby determine a first detection peak in a first set of detectors and a second detection peak in a second set of detectors. The processor may be configured to determine which set has a narrower detection peak, and thereby determine that the detectors having the narrower detection peak are the recessed detectors and the other detectors are the protruding detectors. The processor may be configured to determine therefrom that the source is in the half-space of the protruding detectors and opposite to the recessed detectors.

In some embodiments, the processor may include digital and/or analog electronics configured to analyze the detector signals, determine which detectors exhibit detection peaks, calculate the widths of the detection peaks, compare the widths of the frontward and rearward detector peaks, and determine that the source is in front of the detector array if the rearward detection peak is narrower than the frontward detection peak, and that the source is behind the detector array if the frontward detection peak is narrower. The processor may thereby determine which detectors are protruding and which are recessed relative to that source location. Specifically, the processor can determine that the set of detectors that are offset toward the radioactive source are protruding, and that the set of detectors that are offset away from the position of the radioactive source are recessed. In some embodiments, the processor may be further configured to determine the lateral position of the source according to the lateral position of the recessed detection peak. In some embodiments, the processor may be configured to determine the longitudinal distance of the source from the detector array according to the width of the recessed detection peak. In some embodiments, the processor may be configured to determine the angle of the source relative to the detector array according to a slope parameter related to the detection rates of the protruding detectors. In some embodiments, the processor may be configured to add together the detection rates of all the detectors and to compare that total to a predetermined background rate, and thereby determine whether a source is present.

The processor may include non-transient computer-readable media containing instructions for a method to determine the source location, or parameters of the source location, according to the detection rates in the various detectors. The media may include a predetermined lateral-position correlation function that relates the lateral position of the source to the lateral position of a detection peak, and/or a predetermined peak-width correlation function that relates the source distance to the width of a detection peak, and/or a predetermined slope correlation function that relates the source angle to a slope related to detection rates. Examples are presented for detecting gamma rays and neutrons, but the principles disclosed herein are readily applicable to any particle type. In any application involving clandestine radioactive threats, the ability to rapidly determine the location of a source is of critical importance.

FIG. 1 is a perspective sketch of an exemplary detector array according to some embodiments. As shown by this figure, the exemplary detector array may include an array of slab-shaped detectors 101-102 configured to detect particles 121 from a source 120. The detectors 101-102 are shown positioned with their major faces substantially in contact, including protruding detectors 101 displaced relatively toward the source 120 and recessed detectors 102 displaced relatively farther from the source 120. The longitudinal displacement between the recessed 102 and protruding 101 detectors is the recess distance 103. The protruding and recessed detectors 101 and 102 may be interleaved or placed successively in alternation so that each protruding detector 101 is flanked by two of the recessed detectors 102, and each recessed detector 102 is flanked by two of the protruding detectors 101 (except for the end detectors which have only one adjacent detector). In some embodiments, the detector array may be shaped as a wall-like assembly of longitudinally staggered detectors 101-102 oriented perpendicular to the lateral dimension 107 of the wall, and positioned alternately recessed and protruding relative to the source 120. The overall shape of the depicted detector array is planar as viewed from the top; other shapes are presented below.

In some embodiments, each detector 101-102 may have a height 106 equal to the height of the detector array. The lateral size 107 of the entire detector array may be substantially equal to the sum of the thicknesses 105 of all the detectors 101-102, plus any spacing and intervening material such as wrappings and the like. The longitudinal size 104 of each detector 101-102 in the back-to-front direction is indicated. The protruding detectors 101 thus collimate the recessed detectors 102 by blocking particles arriving from various directions.

Also shown in the sketch is a longitudinal axis 108 projecting centrally perpendicular to the height direction 106 and perpendicular to the lateral direction 107. An aiming plane 109, shown in dash, is a centrally and symmetrically positioned plane parallel to the longitudinal direction 108, parallel to the height direction 106, and perpendicular to the lateral direction 107 of the detector array. As described below, embodiments of the detector array can determine the lateral position of a source 120 relative to the aiming plane 109, the angle of the source 120 relative to the aiming plane 109, the distance or longitudinal position of a source 120 along the longitudinal axis 108, and the front-versus-back position of the source 120. Each such determination may be performed by the processor 110 configured to analyze detection signals 111 emitted by the detectors 101-102 upon detecting the particles 121.

In some embodiments, the detectors 101-102 may include any type of material suitable for detecting the particles and/or their charged secondaries. For example, the detectors 101-102 may include scintillators, semiconductors, or gaseous ionization types of detectors. Scintillators may include organic types such as organic crystalline (stilbene or anthracene for example) or polymer (polyvinyltoluene PVT for example) or liquid (based on mineral oil or other organic liquid for example), or inorganic types such as NaI, BGO, LYSO, CsI, $CdWO_4$, and scintillating glass among many other possibilities. For detecting neutrons, the detectors 101-102 may include a transparent matrix such as polycarbonate or polystyrene or PMMA (poly methylmethacrylate), which may be coated or loaded with a neutron-specific scintillator such as layered ZnS or scintillator microbeads for example. The ZnS or the scintillator microbeads may contain or be proximate to a neutron-capture nuclide such as lithium or boron, and may include lithium glass or borosilicate scintillator. Semiconductor detectors may include n-type or p-type reverse-biased junctions, optionally including a converter layer including a hydrogenous material for neutron scattering, or a neutron-capture material such as boron or lithium, or a high-Z material for gamma conversion (Z being the atomic number). Gaseous ionization detectors may include proportional counters, Geiger tubes, or other gas-filled enclosures configured to collect ionization charges generated by the particles and/or their secondaries, and optionally layered or coated with a high-Z gamma converter, or a lithium or boron neutron-capture layer, or a hydrogenous neutron-scattering layer for example. Responsive to detecting the particles, the detectors 101-102 may emit signals 111 such as electronic pulses which may be conveyed to the processor 110 for analysis. The detectors 101-102 and/or the processor 110 may include optical and/or analog electronics to tailor the signals 111 for analysis, such as light sensors for scintillator detectors or amplifiers for semiconductor detectors, as well as transducers, filters, amplifiers and the like.

In some embodiments, the detectors 101-102 may be configured to detect one particle type and to not detect another particle type, such as detecting neutrons but not gamma rays, or vice-versa. More specifically, the detectors 101-102 may be configured to emit a first signal responsive to detecting a neutron interaction, and a second signal different from the first signal responsive to detecting a gamma ray interaction. For example, detectors including ZnS and LiF layered in PMMA are sensitive to neutrons but essentially blind to gamma rays due to the excitation threshold of ZnS scintillator. Alternatively, many inorganic scintillators such as NaI and BGO are efficient gamma detectors but nearly neutron-blind due to the low neutron-capture rates for the nuclides involved and the lack of recoil hydrogen. In other embodiments, the detectors may be configured to emit signals indicative of the particle type, such as PSD (pulse-shape discriminating) organic scintillators, or certain inorganic scintillators such as CsI and elpasolites, that emit differently shaped pulses for gamma-generated electrons and neutron-generated ions. In some embodiments, the processor may be configured to reject any events in which a detector registers an energy deposition greater than the maximum energy of the particles being sought. For example, most gamma rays and neutrons from nuclear materials have energies in the range of 1-2 MeV with a few reaching 4-5 MeV. A cosmic ray, on the other hand, traveling at nearly the speed of light, generally deposits energy at a rate of 2 MeV per cm of path in organic scintillators (with density of about 1 gm/cm$^3$). Thus, for a plastic scintillator detector with a thickness of 15 cm and a height of 200 cm, cosmic rays generate huge pulses corresponding to at least 30 MeV (going orthogonally through the thickness) up to 400 MeV (for a vertical path). Therefore, an energy cutoff at about 5 MeV eliminates almost all of the cosmic ray background events, other than a tiny fraction that pass through a corner of the detector.

In some embodiments, the thickness 105 of the detectors 101-102 may be related to the average interaction distance of the particles in the detector material. The average interaction distance is the distance that the particle travels, on average, before being scattered or absorbed or otherwise interacting detectably with the material. For example, the average interaction distance may be an inverse mass-attenuation factor for gamma rays, or an elastic scattering distance for energetic neutrons, or a (projected) neutron-capture mean free path for low energy neutrons. In some embodiments, the detector thickness 105 may be at least equal to the average interaction distance of the particles in the detector material and thereby provide sufficient collimation or contrast between the protruding 101 and recessed 102 detectors. In other embodiments, the detector thickness 105 may be 2 or 3 or more times the average interaction distance, so as to provide greater contrast. In a preferred embodiment, the detector thickness is 1 to 3 times the average interaction distance of the particles in the detector material.

In some embodiments, the longitudinal size 104 of the detectors 101-102 may be related to the average interaction distance of the particles. For example, the longitudinal size 104 of the detectors 101-102 may be at least equal to the average interaction distance so as to provide sufficient detection efficiency, or more preferably at least 2 times the average interaction distance for additional detection efficiency, and may be 3 or 4 or 5 or 10 or more times the average interaction distance for further detection efficiency.

In some embodiments, the recess distance 103 may be related to the detector thickness 105. For example, the recess distance 103 may be at least equal to the detector thickness 105 so as to provide a sufficiently narrow angular field of view of the recessed detectors 102. In other embodiments, the recess distance 103 may be 2 or 3 times the detector thickness 105 for improved angular resolution, and in some embodiments the recess distance 103 may be 4 or 5 times the detector thickness 105 or more. In a preferred embodiment, the recessed detectors 102 are recessed relative to the protruding detectors 101 by a distance of 1 to 3 times the thickness 105 of each detector. The protruding detectors 101 may block particles 121 that arrive at certain angles, thereby restricting the angular field of view of each recessed detector 102, wherein the angular field of view of each recessed detector 102 is related to the ratio of the recess distance 103 to the detector thickness 105. Specifically, a higher ratio results in a narrower angular field of view for each recessed detector 102.

In some embodiments, the height 106 of the detector array may be at least 0.5 meter to intercept a sufficient fraction of the emitted particles 121, and more preferably at least 1 meter for a greater solid angle, and may be 2 or 3 or 4 meters or more when needed to scan large objects. In some embodiments, the lateral size 107 of the detector array may be at least 1 meter to view a sufficient range of lateral positions, and more preferably at least 2 meters for a greater lateral range, and may be 3 or 5 or 10 or 20 meters or more depending on the size or distance of the inspection item. The number of detectors 101-102 in the detector array may be substantially equal the lateral size 107 of the array divided by the detector thickness 105, aside from intervening materials such as foil and tape for example. In some embodiments, the number of detectors may total at least 10 to provide a sufficient spatial resolution, and more preferably 20 detectors for a larger total field of view, and may be 30 or 50 or 100 or 200 or more detectors in a large inspection installation.

In a first exemplary embodiment, the detectors 101-102 may include a PVT-based scintillator configured to detect 1-2 MeV gamma rays by Compton scattering. The detector array height 106 may be 2.5 meters, the detector array lateral size 107 may be 15 meters, the detector thickness 105 may be 15 cm, the total number of detectors may be 100, the longitudinal size 104 of the detectors may be 50 cm, and the recess distance 103 may be 25 cm, thereby providing a detection area of 37.5 square meters and a detector array weight (not including accessories discussed below) of about 19 tons.

In a second exemplary embodiment, the detectors 101-102 may include BGO scintillator configured to detect 100-500 keV gamma rays. The detector array height 106 may be 0.5 meters, the detector array lateral size 107 may be 1 meter, the detector thickness 105 may be 1 cm, the total number of detectors may be 100, the longitudinal size 104 of the detectors may be 4 cm, and the recess distance 103 may be 2 cm, thereby providing a detection area of 0.5 square meters and a total weight of about 140 kg.

In a third exemplary embodiment, the detectors 101-102 may include a PMMA matrix loaded with scintillating microbeads containing ZnS or other scintillator, along with lithium or boron neutron-capture targets, and thereby configured to detect neutrons. The detector array height 106 may be 4 meters, the detector array lateral size 107 may be 20 meters, the detector thickness 105 may be 10 cm, the total number of detectors may be 200, the longitudinal size 104 may be 40 cm, and the recess distance 103 may be 20 cm, thereby providing a detection area of 80 square meters and a detector array weight of about 33 tons.

Figure 2:
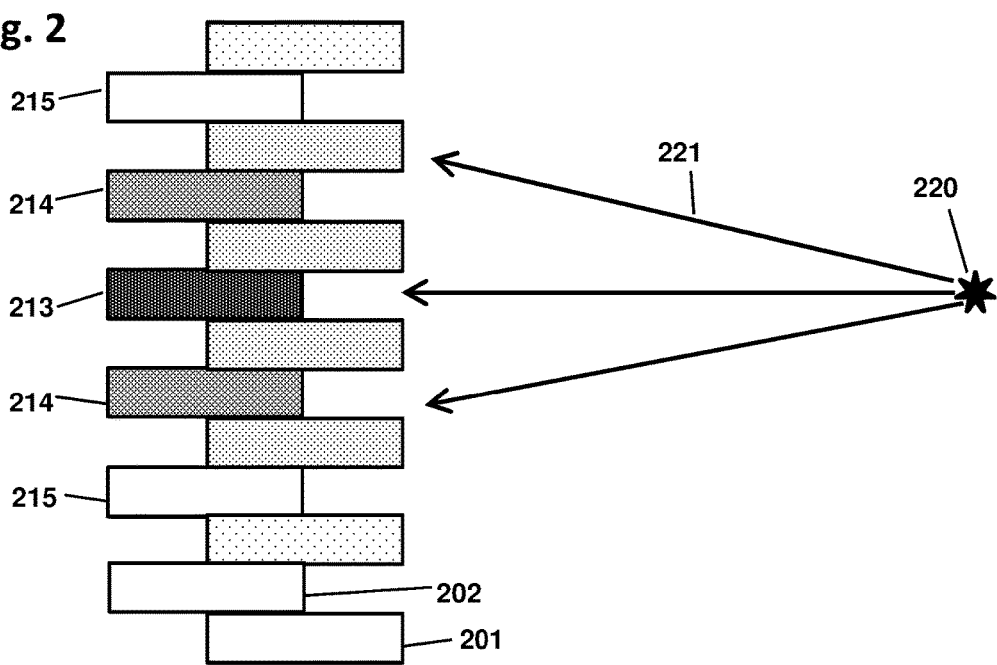
FIG. 2 is a cross-section sketch of an exemplary detector array including alternating recessed and protruding detectors and a radioactive source according to some embodiments.

FIG. 2 is a top-view cross-section sketch of an exemplary detector array showing protruding detectors 201 alternating with recessed detectors 202 according to some embodiments. A source 220 is shown in front (to the right in this sketch) and is emitting particles 221. A particular recessed detector 213 is directly aligned at the source 220, and therefore is unobscured by any of the protruding detectors 201, and therefore has a high detection rate as indicated by the dark stipple fill. The neighboring recessed detectors 214 are partially obscured, and therefore have lower detection rates, as shown in medium stipple. The other recessed detectors 215 are nearly or completely blocked by the protruding detectors 201 and are shown clear. The distribution of detections in the various recessed detectors 202 thus exhibits a narrow detection peak, or region of enhanced detection, with a maximum detection rate in the particular recessed detector 213 that is directly aligned with the source 220. The lateral position of the detection peak in the recessed detectors 202 thereby indicates the lateral position of the source 220.

The protruding detectors 201 also detect the particles 221, but unlike the recessed detectors 202, the protruding detectors 201 have a much broader detection distribution since the protruding detectors 201 directly face the source 220 without collimation. In general, each protruding detector 201 has a detection rate proportional to its geometrical area as viewed by the source 220, and consequently the detection peak of the protruding detectors 201 is much wider than the narrow detection peak of the recessed detectors 202.

In some embodiments, the processor may be configured to first determine whether a source is present, then to determine whether the source is in back or front of the detector array, and then to determine the lateral position and longitudinal distance of the source. The processor may determine whether a source is present by adding the detection rates of all the detectors 201-202, and comparing that total detection rate to a predetermined background rate, thereby determining that a source is present if the total detection rate exceeds the background rate substantially, such as exceeding it by 1 or 2 or 3 or more times the expected statistical uncertainty.

In some embodiments, the processor may be configured to compare the detection distributions in the various detectors 201-202 and thereby determine which detectors 201-202 have wider or narrower detection peaks, and thereby determine whether the source 220 is in front or behind the detector array, and thereby determine which detectors are of the protruding type and which are recessed relative to the source position. If more than one source is present, the detection peaks corresponding to each source may be compared to determine each source's front-versus-back position. If one source is in front and another source is behind the detector array, then the detectors that are protruding toward one source are recessed from the other source, and vice-versa.

In some embodiments, the processor may be configured to determine the lateral position of the source 220. For example, the processor may simply determine that the lateral position of the source 220 is equal to the lateral position of the recessed detection peak, without further corrections. This may be satisfactory for many applications. However, the detection distribution is often modified by scattering or end effects or other effects, in which case a more precise value for the source lateral position may be obtained by using a predetermined lateral-position correlation function that accounts for such effects. Accordingly, the processor may obtain an improved estimate of the lateral source position by using a predetermined lateral-position correlation function that relates the lateral position of the detection peak to the true lateral position of the source including corrections. As a further option, the processor can fit the detection peak to a parabolic or Gaussian or other shape, and can then provide the lateral position of the centroid of that fit to the lateral-position correlation function, thereby obtaining an even more precise determination of the lateral position of the source 220.

In some embodiments, the predetermined lateral-position correlation function may be prepared experimentally, for example by measuring the detection peak position while a test source is moved to various positions around the detector array. Alternatively, a simulation program such as MCNP or GEANT may be used to prepare the lateral-position correlation function. As used herein, a "correlation function" is any set of data that relates a measured value to a predicted parameter, for example relating the lateral position of a detection peak to the lateral position of the source. Such correlation functions may include analytic functions, tables of measured or computed values, algorithms such as computer programs, graphical devices, or any other set of data that can be used to derive the predicted parameter from the measured value. In addition, when the correlation function includes discrete values, such as tabular values, then the values may be interpolated to obtain results lying between the predetermined table values.

In some embodiments, the processor can determine the distance from the detector array to the source 220. The source distance is generally related to the widths of the detection peaks, including the narrow detection peak of the recessed detectors as well as the broad detection peak of the protruding detectors. Both types of detection peaks are related to the source distance in that they both become much wider as the source moves farther away. Usually the recessed detection peak provides the most precise determination of the source distance since it is narrower. As shown in the figure, the recessed detectors 202 are the collimated by the protruding detectors 201 and thus have a narrow detection peak, while the protruding detectors 201 face the source 220 openly and hence have a much wider detection peak.

The width of the detection peaks may be determined by any suitable calculation, such as the FWHM (full width at half-maximum) of the distribution, or a parabolic fit or Gaussian fit or other fitting function, or by other analysis means to estimate a detection peak width from the distribution of counting rates among the protruding 201 or the recessed 202 detectors. In addition, a predetermined peak-width correlation function may be prepared that relates the width of the detection peak to the source distance. The peak-width correlation function may be prepared experimentally by measuring the width of the detection peak while a test source is placed at various distances from the detector array, or using a simulation program. The processor may then be configured to determine the source distance by calculating the width of the detection peak and then providing that value to the predetermined peak-width correlation function, which then provides an estimate of the source distance.

At larger source distances and larger source angles, the detection distribution in the protruding detectors 201 may be used to determine the source angle. The distribution of detections in the protruding detectors 201 is related to the geometrical area of each detector, which is angle-dependent. As viewed by the source 220, the detection distribution changes as the source angle is increased. For example, at larger source distances, the distribution of detections in the protruding detectors 201 may exhibit a slope which is related to the angle of the source 220, as detailed below. In that case, the source angle may be determined by fitting the slope of the source-facing detector data, and providing that slope to a predetermined slope correlation function, which then determines the source angle.

FIGS. 3A, 3B, 3C, and 3D are charts from a simulation using the program MCNP6 to detect simulated 1 MeV neutrons from a source placed at various lateral positions relative to a simulated detector array. The simulation layout is illustrated in FIG. 3E. The simulation was intended to test how well a vehicle inspection station could locate nuclear materials in cargo. The simulated source was positioned 3 meters from the front of the detector array, in accordance with many inspection arrangements. The simulated detector array had 99 detectors of PMMA with 100 ppm (at/at) loading of $^{10}B$ surrounded by an unspecified organic scintillator to detect the alpha particles from neutron capture. The detector width was 15 cm and the recess distance was 30 cm. The endmost detectors were of the protruding type at both ends of the simulated detector array. Each chart shows the detection rate (arb. units) for each detector, with open circles for the recessed detectors and filled circles for the protruding detectors, one data point per detector. As expected, the recessed detectors show a narrow detection peak corresponding to the subset of recessed detectors that have direct or partial exposure from the source, while the protruding detectors show a much broader detection peak due to geometrical effects. The sharpness of the recessed detector peak enables a precise determination of the lateral position of the source in some embodiments.

The simulated source was placed at lateral positions of 0, 1.1, 2.5, 5.2, and 17 meters, and the longitudinal distance of the source from the detector array was held constant at 3 meters. The charts correspond to source positions as follows: FIGS. 3A, 3B, 3C, and 3D had lateral source positions of 0, 1.1, 5.2, and 17 meters respectively, all with the same longitudinal distance of 3 meters. The 2.5 meter data is not charted but falls between the 1.1 and 5.2 meter results as discussed below.

Figure 3A:
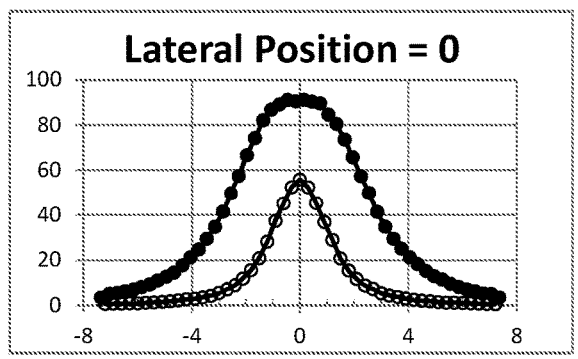
FIG. 3A is a first chart showing the distribution of detections in a simulated detector array versus the lateral position of a simulated neutron source.
Figure 3B:
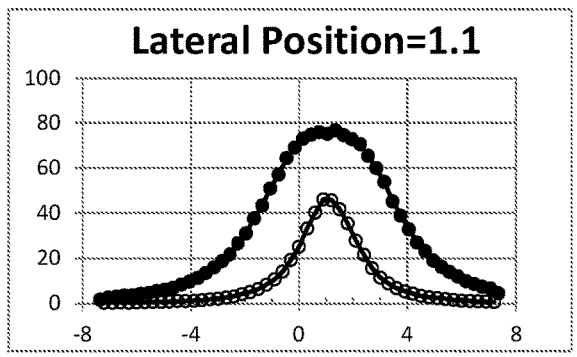
FIG. 3B is a second chart showing the distribution of detections in a simulated detector array versus the lateral position of a simulated neutron source.
Figure 3C:
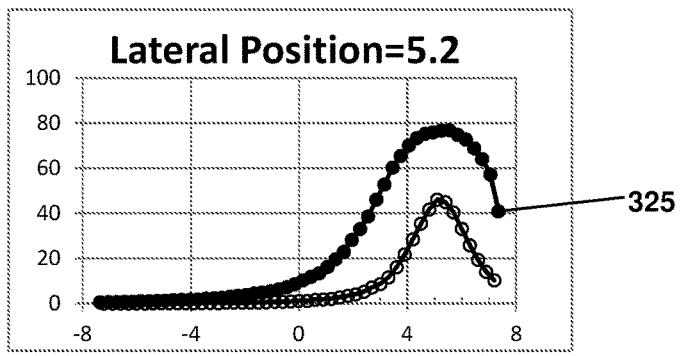
FIG. 3C is a third chart showing the distribution of detections in a simulated detector array versus the lateral position of a simulated neutron source.

In FIG. 3C, the data point 325 corresponding to the endmost protruding detector is substantially lower than the others, which may appear surprising. However, this effect is real and is due to scattering. A significant fraction of the detections registered in each detector come from particles that first enter a different detector and then scatter into the adjacent detector. Thus the full counting rate in each particular detector is a combination of particles that directly impinge on that particular detector, plus other particles that scatter into it from an adjacent detector. The end unit 325 has no scattering partner on one side, and thus has a lower detection rate.

Figure 3D:
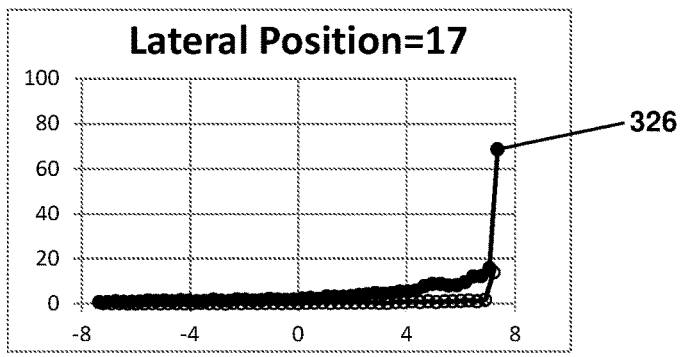
FIG. 3D is a fourth chart showing the distribution of detections in a simulated detector array versus the lateral position of a simulated neutron source.
Figure 3E:
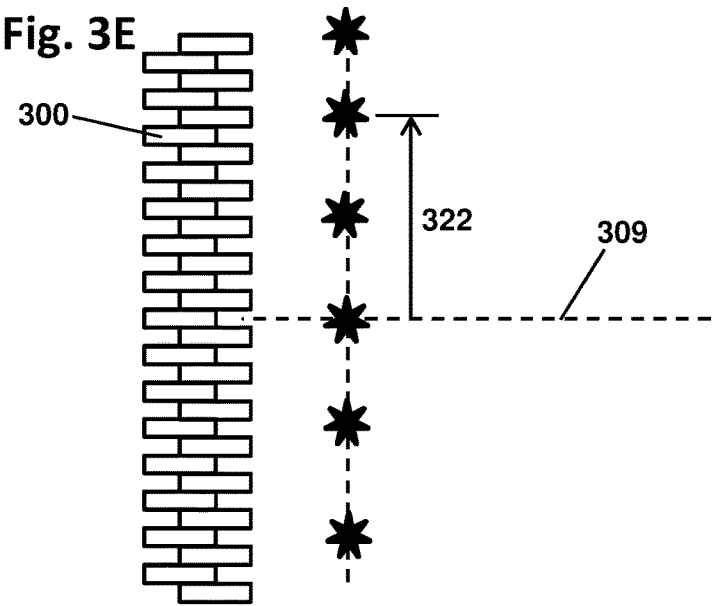
FIG. 3E is a cross-section sketch of an exemplary detector array and various lateral source positions according to some embodiments.

The opposite effect can be seen in FIG. 3D, where the endmost protruding detector rate 326 is much higher than any of the others. This effect is seen whenever the lateral position of the source is beyond the end of the detector array, which in this simulation extends from −7.5 to +7.5 meters. In FIG. 3D, the source was at 17 meters from the center of the array, which is well beyond the end of the detector array. From that position, most of the neutrons arriving at the detector array strike the endmost protruding detector since it is exposed to the neutron flux across its entire longitudinal surface, and very few neutrons reach any of the other detectors since they are mostly blocked by the endmost detector. Accordingly, the endmost detection rate 326 is very high while all the others are near zero. The elevated detection rate 326 of the endmost detector thereby indicates that the source is present, and that it is located outside the ±7.5 meter direct viewing range of the detector array, and that it is on the same lateral side as the high-counting detector 326.

Figure 3F:
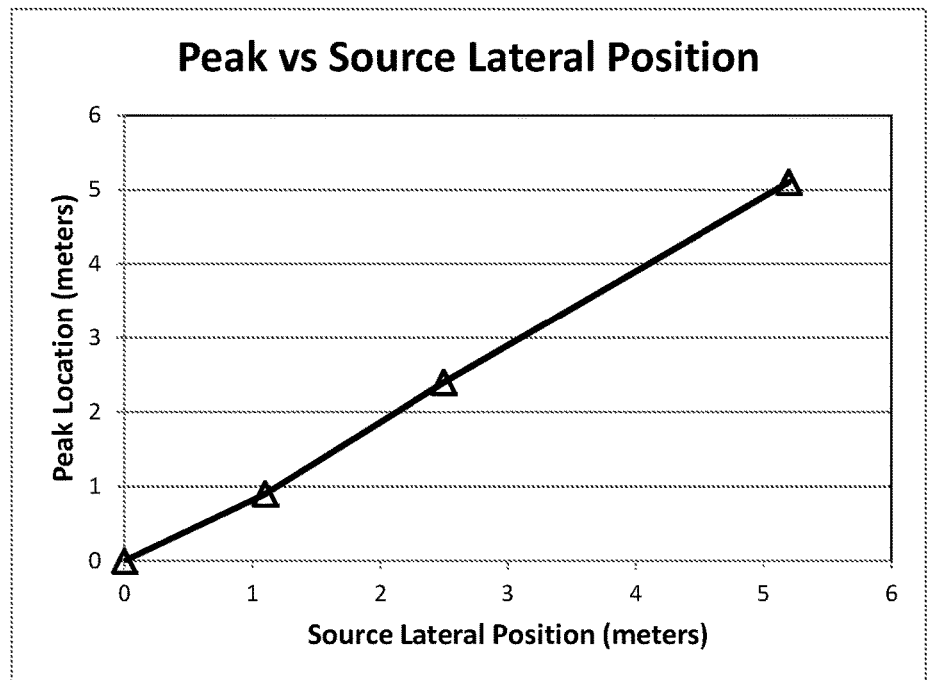
FIG. 3F is a chart showing simulation results correlating a peak location to the lateral position of a simulated source.

FIG. 3E is a cross-section schematic of the simulated detector array 300 with various lateral source positions 322 relative to the aiming plane 309 (shown as a dashed line in this top view). FIG. 3F is a chart showing the lateral-position correlation function between the observed detection peak position in the recessed detector distribution of data, versus the actual source position in the simulation. The chart shows that the lateral position of the source is closely correlated with the lateral position of the peak for source locations within the direct field of view of the rearward detectors. The source lateral position is not exactly equal to the lateral position of the highest-counting detector due to various scattering and end effects, as mentioned. Therefore to obtain a precise determination of the lateral position of the source, the processor may be configured to compare the lateral position of the peak to the predetermined lateral-position correlation function shown in FIG. 3E, which then provides as output the precise lateral position of the source with all corrections included.

Figure 4A:
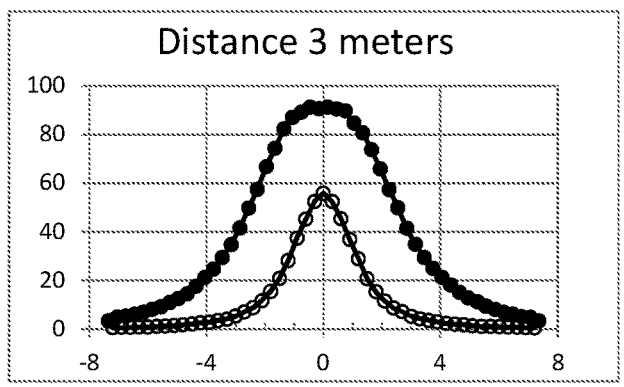
FIG. 4A is a first chart showing the distribution of detections in a simulated detector array versus the longitudinal distance of a simulated neutron source.
Figure 4B:
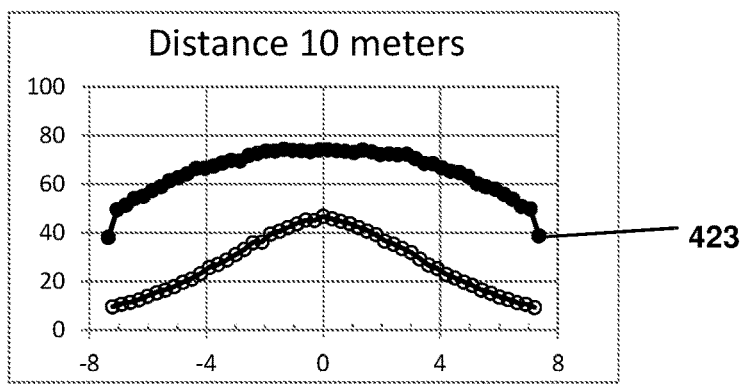
FIG. 4B is a second chart showing the distribution of detections in a simulated detector array versus the longitudinal distance of a simulated neutron source.
Figure 4C:
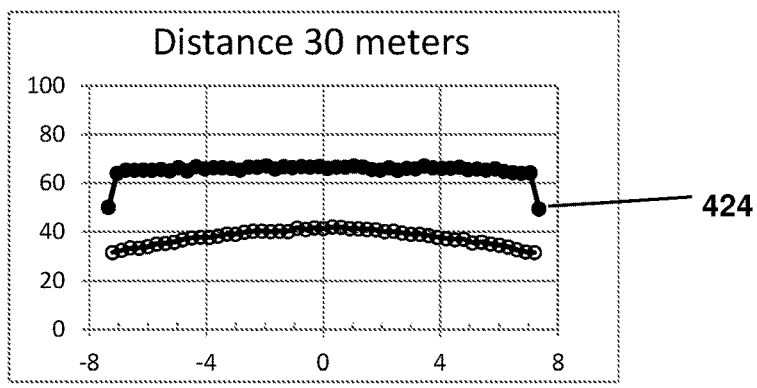
FIG. 4C is a third chart showing the distribution of detections in a simulated detector array versus the longitudinal distance of a simulated neutron source.
Figure 4D:
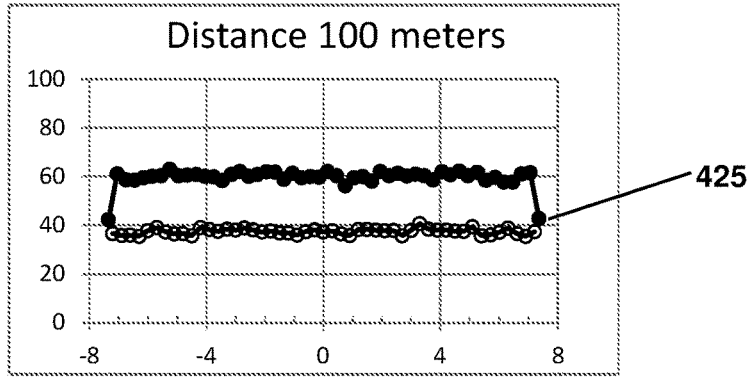
FIG. 4D is a fourth chart showing the distribution of detections in a simulated detector array versus the longitudinal distance of a simulated neutron source.
Figure 4E:
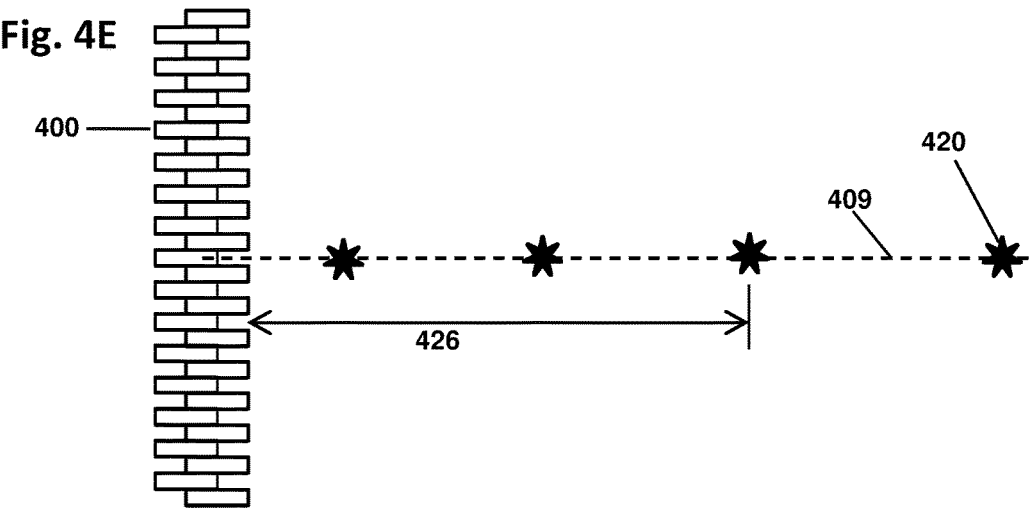
FIG. 4E is a cross-section sketch of an exemplary detector array with various longitudinal source positions according to some embodiments.

FIGS. 4A, 4B, 4C, and 4D are charts from the MCNP6 simulation, but now with the source positioned at various distances along the aiming plane, as illustrated in FIG. 4E. The data in FIGS. 4A, 4B, 4C, and 4D correspond to a source longitudinal distance of 3, 10, 30, and 100 meters respectively. Longer runs were used for the larger distances. The intended application is a mobile area scanner of the type used to search for hidden sources by acquiring detection data continuously while traveling around a wide area, such as an urban environment. At a longitudinal source distance of 3 meters, the recessed detectors (open data points) show a narrow detection peak, as previously discussed. At 10 meters distance (FIG. 4B), the recessed detection peak is much wider since at that distance the collimating or obscuration effect of the protruding detectors is correspondingly reduced. At 30 meters (FIG. 4C) the recessed detection peak is very broad, and at 100 meters (FIG. 4D) the curvature is imperceptible by eye. The endmost protruding detectors 423, 424, and 425 again exhibit lower detection rates since they lack a scattering partner on one side, as mentioned.

Figure 4F:
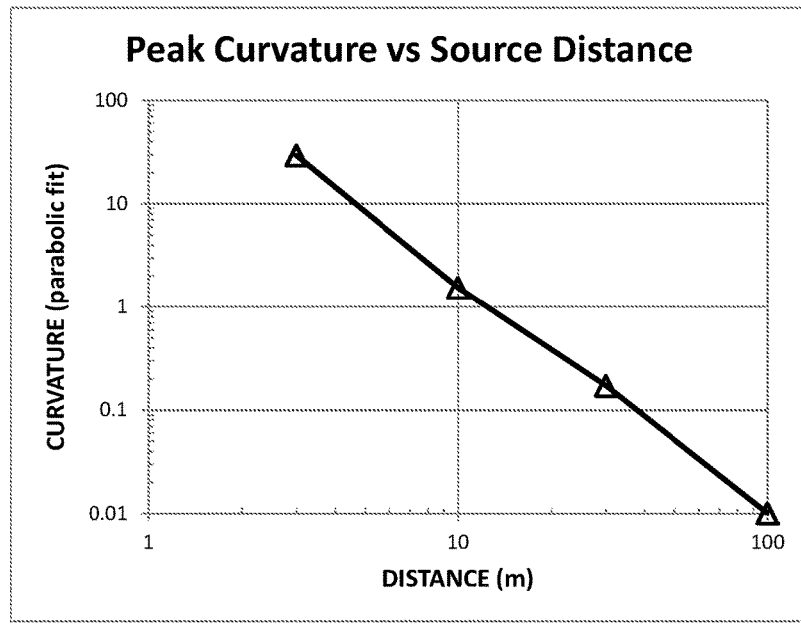
FIG. 4F is a chart showing simulation results correlating a peak curvature to the longitudinal position of a simulated source.

FIG. 4E is a schematic showing the simulated detector array 400 for the simulations of FIGS. 4A-4D. The simulated source 420 was placed at various longitudinal distances 426 from the detector array 400 and centered on the aiming plane 409. The detection rates for the recessed detectors were fit to a parabolic model to quantify the curvature of the detection data. The resulting chart, FIG. 4F, shows the peak-width correlation function that relates the source longitudinal distance to the observed peak width, as measured by the parabolic curvature. The correlation is consistent all the way out to 100 meters distance. Based on this result, then, the processor can be configured to determine the source distance by comparing the width or curvature of the recessed detection peak to the predetermined peak-width correlation function as shown, which provides the source distance directly as output. These results indicate that a mobile scanner using embodiments of the present detector array can detect radioactive sources at substantial ranges and can quantify the longitudinal source distance accordingly.

Figure 5A:
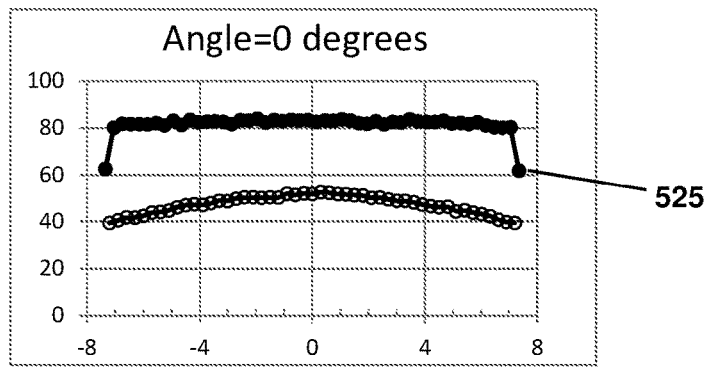
FIG. 5A is a first chart showing the distribution of detections in a simulated detector array versus the angular position of a simulated neutron source.
Figure 5B:
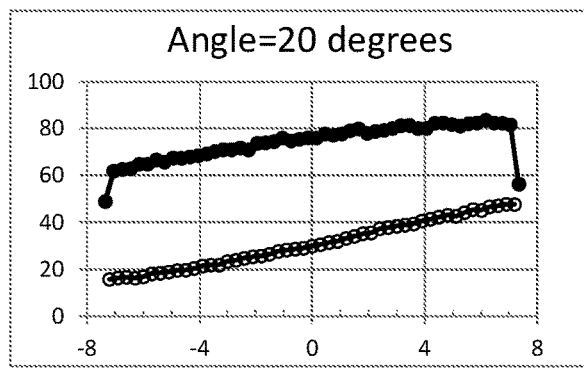
FIG. 5B is a second chart showing the distribution of detections in a simulated detector array versus the angular position of a simulated neutron source.
Figure 5C:
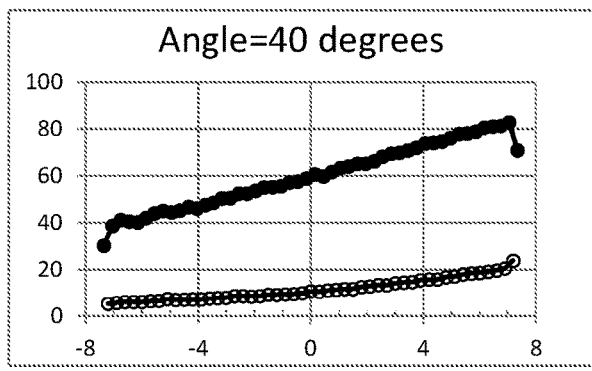
FIG. 5C is a third chart showing the distribution of detections in a simulated detector array versus the angular position of a simulated neutron source.
Figure 5D:
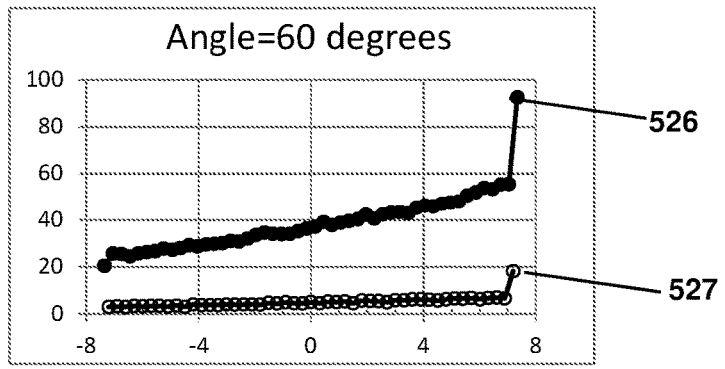
FIG. 5D is a fourth chart showing the distribution of detections in a simulated detector array versus the angular position of a simulated neutron source.
Figure 5E:
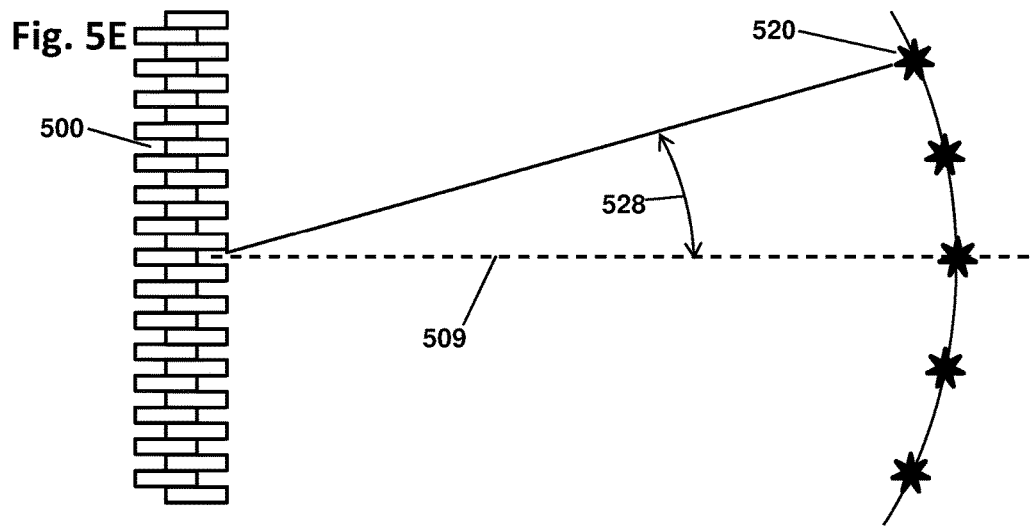
FIG. 5E is a cross-section sketch of an exemplary detector array with various angular source positions according to some embodiments.

FIGS. 5A, 5B, 5C, and 5D are further charts from the MCNP6 simulation, now varying the angle of the source, with the radial distance of the source being constant at 30 meters. FIG. 5E shows the simulated layout. The source angles for FIGS. 5A-5D were zero, 20, 40, and 60 degrees relative to the aiming plane. The charts indicate that the slope of the protruding detector distribution is strongly dependent on the source angle. The endmost values 525 again show lower detection rates due to the lack of scattering-in, as discussed. On the other hand, the endmost data point 526 of the 60-degree simulation is substantially above the neighboring points, thereby indicating that the source is well outside the direct viewing zone of the detector array for that angle, so that most of the arriving particles struck the exposed side of the endmost protruding detector. The 60-degree data also shows an enhanced detection rate in the endmost recessed detector 527, due to particles that scatter through or pass behind the endmost protruding detector 526, and then interact in the adjacent recessed detector 527.

Figure 5F:
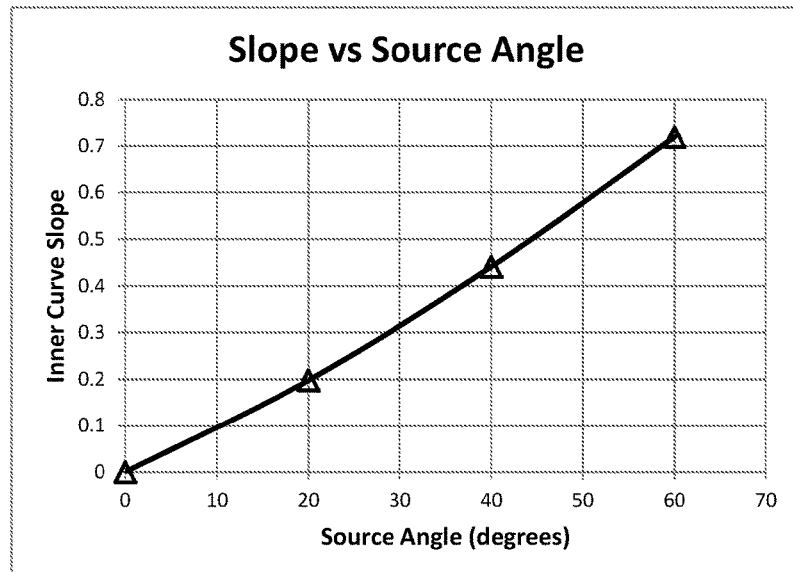
FIG. 5F is a chart showing simulation results correlating a fitted slope to the angular position of a simulated source.

FIG. 5E is a top-view cross-section sketch of the simulated detector array 500 with various positions of the source 520 at different angles 528 relative to the aiming plane 509. FIG. 5F is a chart showing the slope correlation function that relates the source angle to the slope of the protruding detector data, including the effects of the endmost detectors. The smooth curve of FIG. 5F demonstrates that even at large radial distances, the source angle can be determined by the data using this analysis. Therefore the processor may be configured to calculate a slope associated with the protruding detection data, and then comparing the slope to a predetermined slope correlation function, which provides the source angle relative to the aiming plane 509, the result being valid in this case for source angles up to 60 degrees.

All of the simulations were repeated using 1 MeV gamma rays into a PVT-based scintillator detector array, which resulted in essentially the same results as the neutron simulations presented above. The results of both the gamma ray and neutron simulations indicate that embodiments of the detector array can detect and localize a radioactive source, and can determine the front-versus-back location of the source, the source lateral position, the source angle, and the source distance from the detector array. For many inspection applications, the ability to pinpoint the source location, as demonstrated by these simulations, is critically important.

Figure 6:
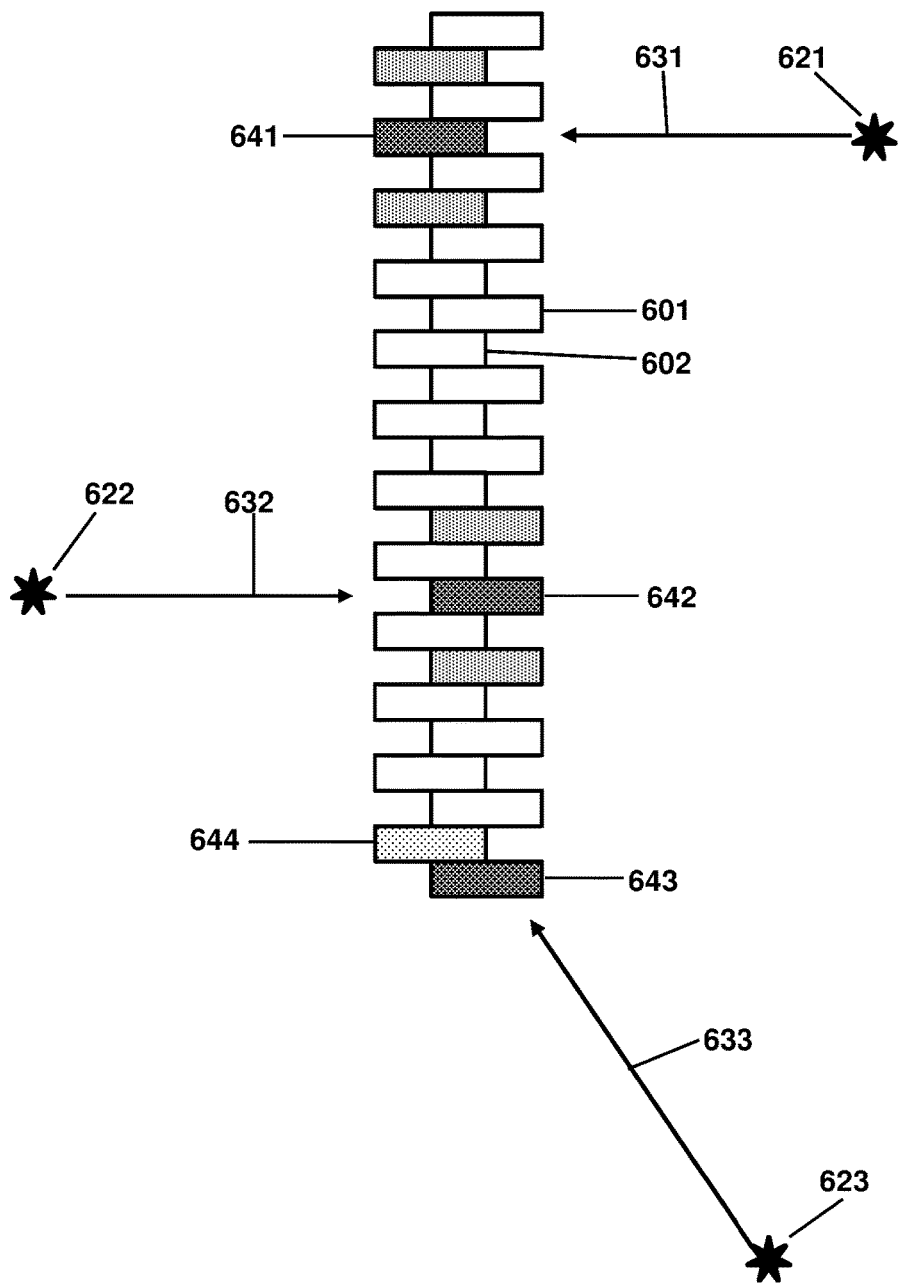
FIG. 6 is a sketch in cross-section of an exemplary detector array detecting multiple sources according to some embodiments.

FIG. 6 is a cross-section sketch of an exemplary embodiment of the detector array detecting and localizing multiple sources simultaneously. Since sources are present on both sides of the detector array, it is convenient to refer to the two sets of detectors as "frontward" and "rearward". Then, to determine how each source is detected, the groups of detectors that are exposed to each source may be termed protruding or recessed as viewed by each of the sources separately. Accordingly, the detector array may include interleaved frontward detectors 601 and rearward detectors 602 according to their displacement toward the front (to the right in this sketch) or toward the back. A first source 621 is in the front and emits particles 631 which are detected in a particular rearward detector 641 which is directly aligned with the first source 621. Since the first source 621 is in the front, the frontward detectors 601 are protruding (toward the source 621) and the rearward detectors 602 are recessed, as viewed by the first source 621. Hence the first source 621 produces a narrow detection peak 641 in the rearward detectors 602 as indicated.

A second source 622 is in the back and emits particles 632 which are detected in a particular frontward detector 642. Since the second source 622 is in the back, the frontward detectors 601 are now the recessed ones, and the rearward detectors 602 are now protruding toward the second source 622. Accordingly, the rearward detectors 602 may act as collimators that restrict the lateral field of view of the frontward detectors 601, resulting in a narrow detection peak 642 among the frontward detectors 601.

The third source 623 is in the front but at a large angle to the detector array. The third source 623 emits particles 633 which are primarily detected in the endmost frontward detector 643 and partially in the endmost rearward detector 644. Since the maximum detection occurs in the endmost detector 643, it indicates that the third source 623 is located laterally beyond the end of the detector array. It is usually not feasible to determine the source lateral position or distance using only the endmost detector data 643; however, a high detection rate in an endmost detector can reliably indicate that there is a third source 623 present, that the source 623 is positioned beyond the extent of the detector array, and that the source 623 in the lateral direction of the endmost detector 643.

The figure thus illustrates how the detector array can detect and localize multiple sources at the same time, how sources in front and behind the detector array can be analyzed for position, and how a source far outside the field of view can be detected as well.

Figure 7:
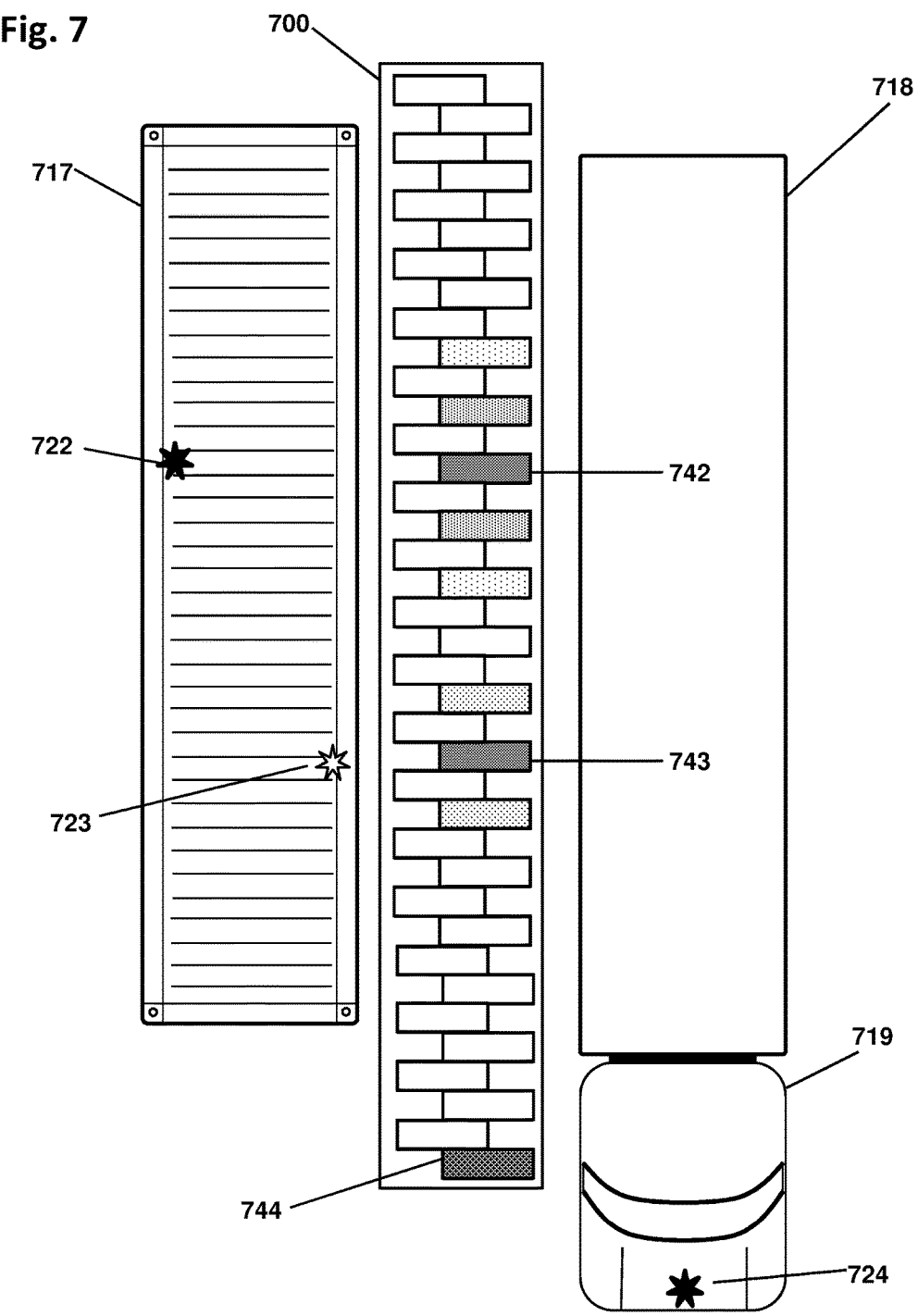
FIG. 7 is a sketch in cross-section of an exemplary detector array configured to inspect trucks and shipping containers for radioactive sources according to some embodiments.

FIG. 7 is a cross-sectional top view of an exemplary vehicle inspection station configured to scan two vehicles simultaneously, according to some embodiments. An embodiment of the detector array 700 is shown scanning a cargo container 717 and a semi-trailer 718. An adversary has placed a heavily shielded clandestine nuclear weapon 722 on the left side of the cargo container 717 among shielding and clutter. The adversary knew which lane of the inspection station is normally used for scanning containers, and so he packed the weapon 722 as far from the detector array 700 as possible. The adversary has also placed a legal benign source 723 in the cargo container, and has declared the legal source 723 on the manifest, the intent being to confuse the radiation scan so it would miss the weapon 722. However, the detector array 700 has defeated the obfuscation attempt by successfully detecting both the weapon 722 and the legal source 723, according to the two peak detections 742 and 743. Since the narrow detection peaks 742 and 743 are observed in the right side of the array, this indicates that the sources 722 and 723 are to the left and therefore in the cargo container 717. The lateral position of the weapon 722 was determined according to the lateral position of the detection peak 742 as shown, and the lateral position of the legal source 723 was determined according to the lateral position of the second peak 743. Therefore, the officials, seeing two sources in the shipping container 717 whereas only one was declared, may issue an alert.

The semi-trailer 718 is also being scanned at the same time. The trailer 718 itself is apparently clean, but the tractor 719 includes a hidden pack of radioactive materials 724 which the adversary has placed in the very front in an attempt to avoid detection. In addition, the driver has parked the tractor 719 as far forward as possible, stopping well beyond the end of the inspection array 700, in an attempt to avoid detection. However, the endmost detector 744 registers a large excess of detections since it is directly exposed to particles from the radioactive materials 724, and thereby defeats the attempt. Since the high-counting detector 744 is the endmost detector in the array, it does not determine the lateral position of the materials 724 precisely, but it does indicate that a third source is present and is positioned beyond the end of the detector array.

The examples of FIG. 7 show how an embodiment of the detector array 700 can detect and localize a shielded weapon 722 and clandestine nuclear materials 724 in two highly adversarial vehicles, simultaneously, despite shielding and deliberate obfuscation.

Figure 8:
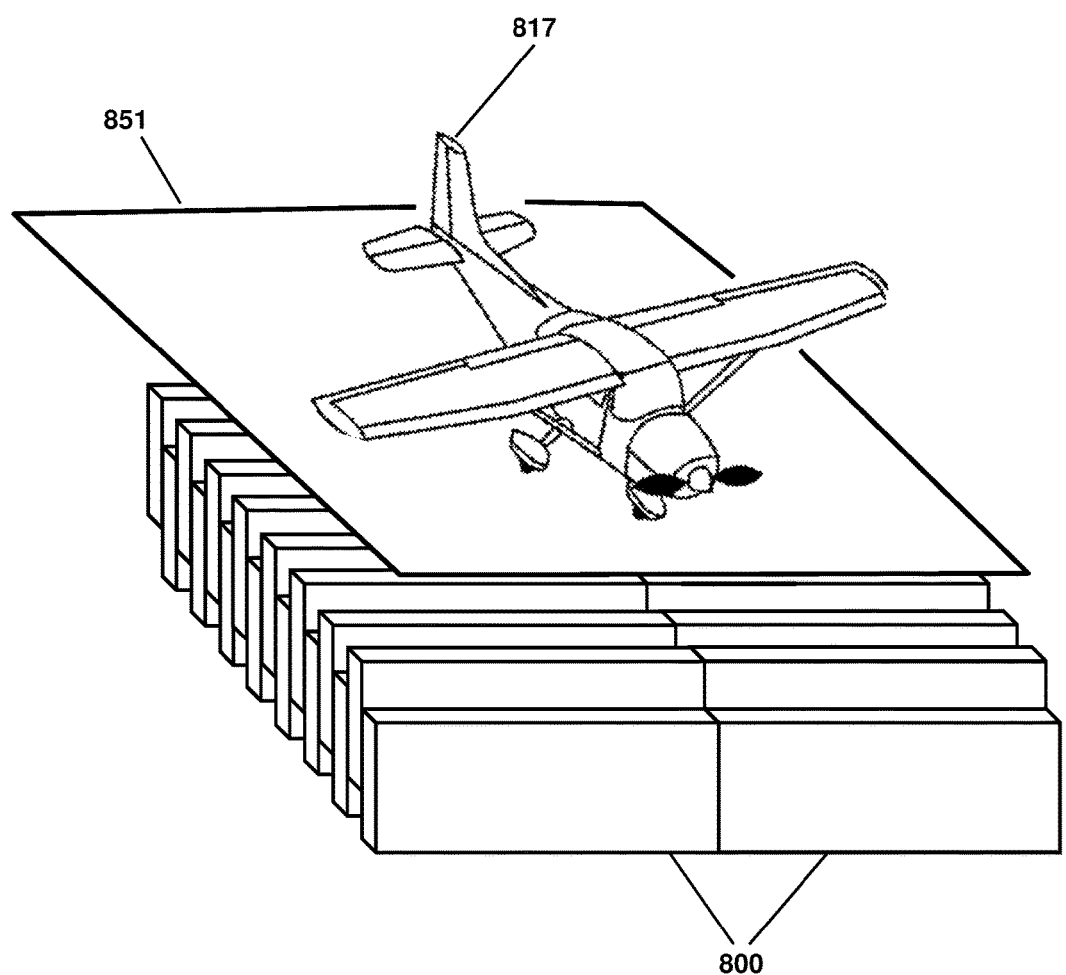
FIG. 8 is a sketch in perspective of an exemplary detector array configured to inspect airplanes for radioactive sources according to some embodiments.

FIG. 8 is a perspective sketch of an inspection assembly including two exemplary detector arrays 800 positioned under a tarmac 851 to scan a small airplane 817, according to some embodiments. An attempt to smuggle nuclear material by air may be detected in such a scan. The exemplary detector arrays 800 are arranged side-by-side to cover the wider area of the airplane 817. Larger freight and passenger planes can be scanned by further extending the detector arrays 800 as needed.

Figure 9:
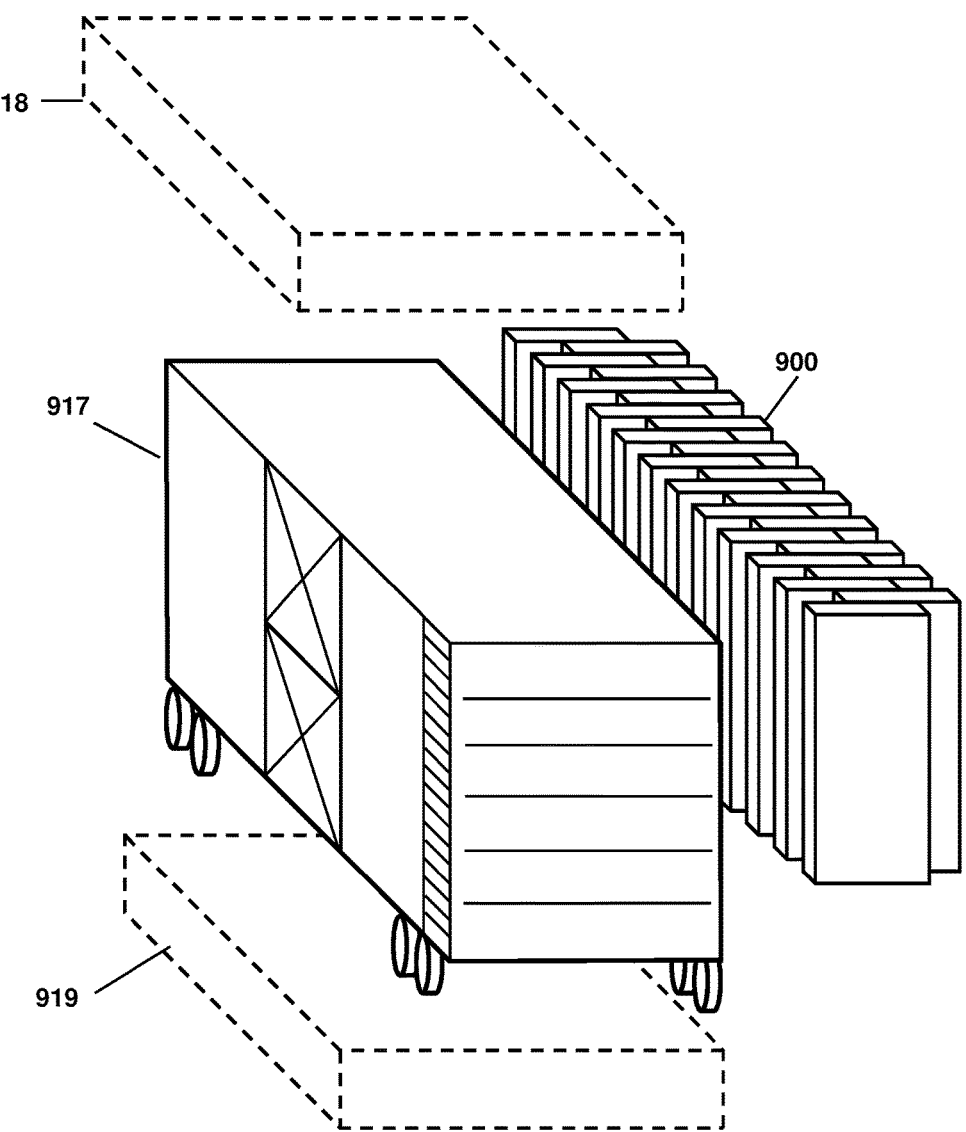
FIG. 9 is a sketch in perspective of an exemplary detector array to inspect vehicles in cooperation with cosmic ray tracking chambers according to some embodiments.

FIG. 9 is a sketch in perspective of an exemplary detector array 900 for inspecting a railroad freight car 917 or other vehicle or container, according to some embodiments. Also shown in dash are an upper 918 and a lower 919 tracking chamber, each chamber 918-919 being configured to measure environmental cosmic rays (primarily high-energy muons) that continually pass through the freight car 917 from above. The chambers 918-919 are configured to precisely measure the tracks of the cosmic rays and thereby detect any large-angle scattering of the cosmic rays. Cosmic ray scattering, particularly at large angles, is an indication of the high-Z components of a nuclear weapon and its high-density shielding.

In some embodiments, the detector array 900 may be configured to detect radiation from the freight car 917 and to localize any sources detected, while the cosmic ray tracking chambers 918-919 detect the high-Z weapon components by cosmic ray scattering. The detector array 900 is shown positioned just outside the field of view of the tracking chambers 918-919 to avoid introducing additional scattering. Alternatively, the detector array 900 may be positioned closer to the freight car 917 and within the field of view of the tracking chambers 918-919, while a processor associated with the tracking chambers 918-919 may be configured to account for the extra scattering of any cosmic ray tracks that pass through the detector array 900. On the other hand, some embodiments of the detector array 900 include primarily low-Z, low-density materials such as plastic scintillator, which introduces such minimal scattering that there may be no need for such a correction. Additional detector arrays may be positioned on the other side of the freight car 917, or below the lower tracking chamber 919 and facing upward, or above the upper tracking chamber 918 and facing down, for additional radiation detection coverage while avoiding any interference with the cosmic ray measurement.

An advantage of the combined radiation detection and cosmic ray scattering systems is that together they leave an adversary with no design space for a clandestine weapon. If the adversary increases the amount of shielding in an attempt to limit the detectable radiation signal, then the extra shielding would cause further cosmic ray scattering which the tracking chambers 918-919 readily detect. If the adversary attempts to minimize the scattering by using less shielding, the radiation detector array 900 would then quickly detect the radiation.

Figure 10:
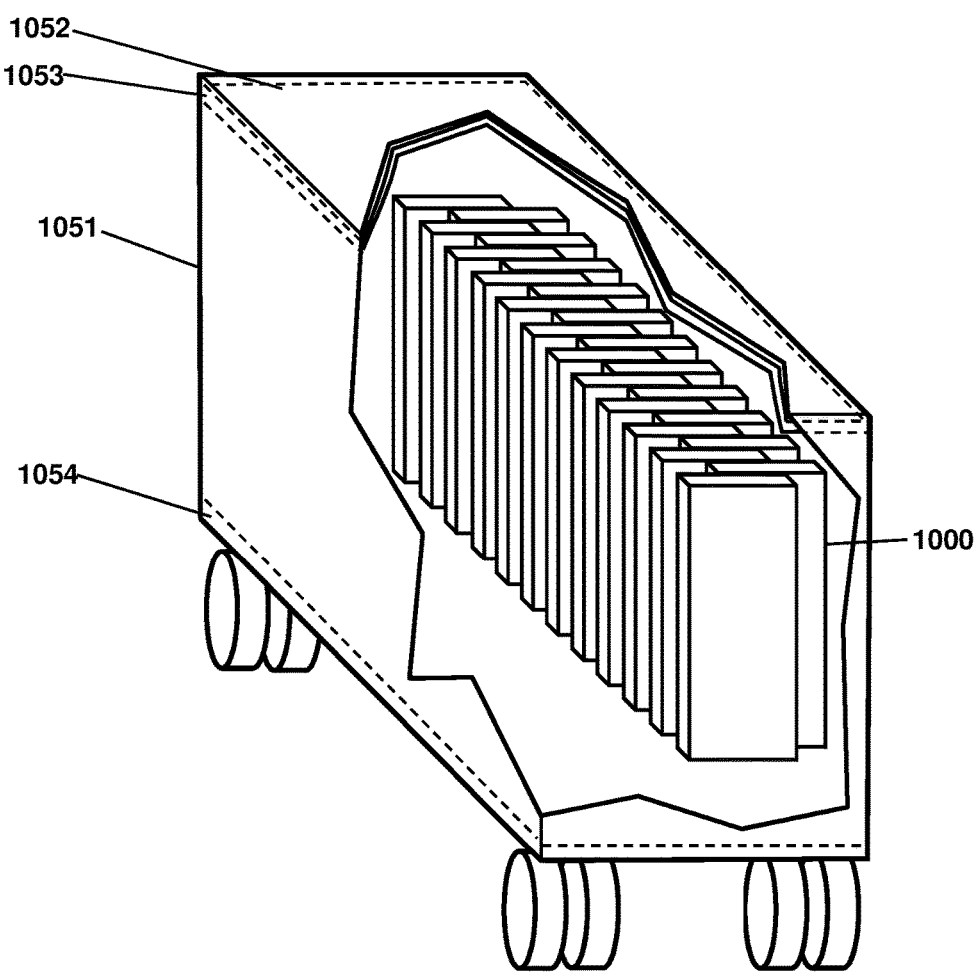
FIG. 10 is a sketch in perspective, partly cut-away, of an exemplary detector array installed in a mobile scanner for detecting hidden radioactive sources according to some embodiments.

FIG. 10 is a sketch in perspective, partly cut-away, of an exemplary mobile scanner of the type that may be driven around a region, such as an urban region, to detect and localize any hidden weapons. In some embodiments, the detector array 1000 may be installed in a van or trailer 1051 or other vehicle, and oriented to detect radioactive sources on both sides simultaneously while the vehicle is driven in motion around the inspection area. The embodiment depicted includes a ceiling scintillator 1052 configured to reject any events coming from cosmic rays. The embodiment further includes a layer of LiF neutron shielding in polyethylene on the top 1053 to capture low-energy neutrons from cosmic rays, and a second neutron shield 1054 on the bottom to block ground-effect neutrons.

Figure 11:
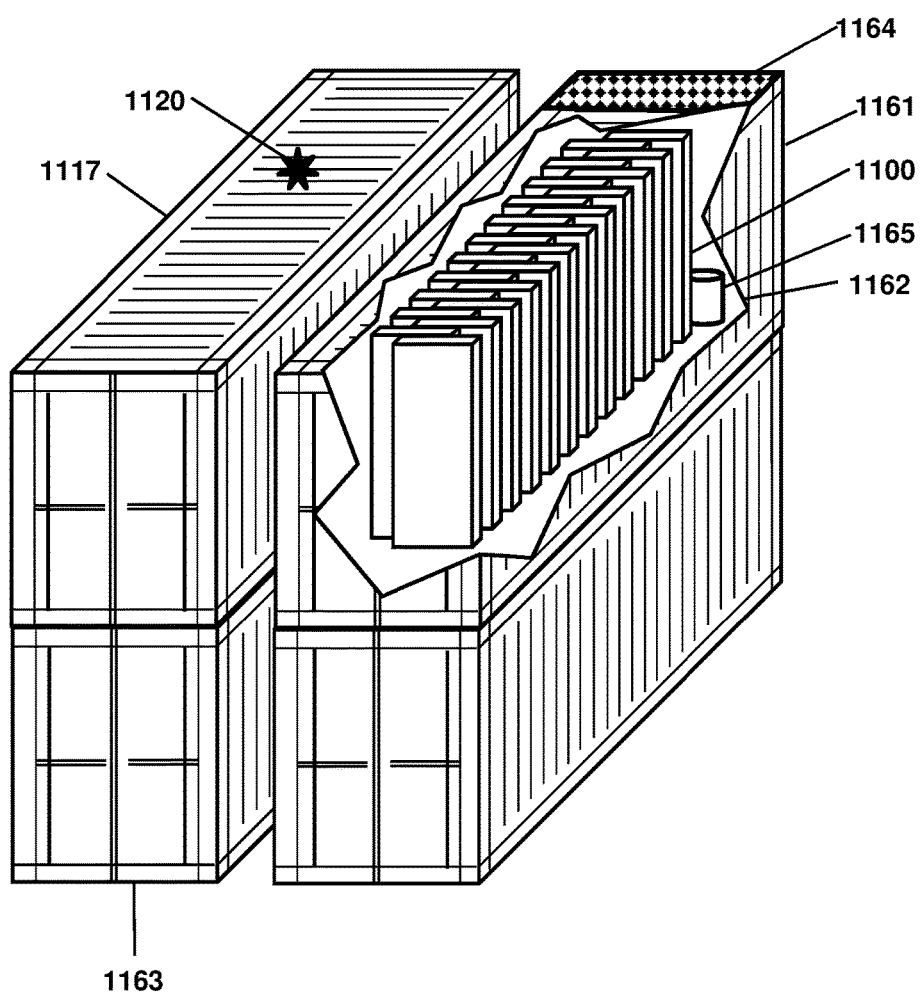
FIG. 11 is a sketch in perspective, partly cut-away, of an exemplary detector array mounted in a shipping container for inspecting other shipping containers according to some embodiments.

FIG. 11 is a perspective sketch of an exemplary inspection device including a detector array 1100, mounted in an enclosure 1161 such as a shipping container (shown partly cut-away 1162), according to some embodiments. The enclosure 1161 may be stackable and fork-lift-portable, and so can be stacked near an inspection object 1117 such as a truck or another shipping container for a high-sensitivity inspection. In some embodiments, the enclosure 1161 and the internal detector array 1100 may be configured so that the entire enclosure 1161 can be turned on its side and continue to function in that orientation, so as to inspect an inspection object 1117 which is stacked above or below the enclosure 1161. By acquiring data for a longer term, such as one hour or longer, the detector array 1100 can detect even highly-shielded sources, according to some embodiments. In this case the inspection object 1117 is another shipping container which contains highly-shielded nuclear components 1120. The detector array enclosure 1161 and the inspection object 1117 container may be stacked on top of other benign containers 1163, as is common practice at shipping ports. In this example, a brief 30-second entry scan failed to detect the nuclear components 1120, due to the high-quality shielding. But with a longer 60-minute or 24-hour scan, the detector array 1100 can detect particles coming from a single location and can thereby reveal the nuclear components 1120. The depicted detector array 1100 and its enclosure 1161 may be useful for taking long and highly sensitive scans of suspicious containers while they are waiting in a shipping port or border crossing, for example. Often the containers are stacked and held in the port yard for 1 or 2 days, or up to a week, during which time the detector array 1100 can detect even low-intensity or well-shielded threat materials, according to some embodiments. Also shown is a photovoltaic solar panel 1164 (checkerboard hatch) which may be mounted on the top of the enclosure 1161 as shown, or it may be detachable and remountable on a side of the enclosure 1161 so as to improve the sunlight exposure. The panel 1164 may be configured to provide electrical power to run the detector array 1100. Also shown is a rechargeable battery 1165 which may be configured to be recharged by the panel 1164, or otherwise recharged by some electrical source, and to provide power to the detector array 1100 at night or whenever the photovoltaic panel 1164 is obscured. Such a self-contained power system may be safer and more convenient than running extension cords around a port yard which is generally busy with vehicle traffic night and day.

FIG. 12 is a cross-section sketch of an exemplary assembly including a detector array including frontward detectors 1201 and rearward detectors 1202, plus a number of thin additional surface detectors termed "counters" herein. In some embodiments, the counters include front-outer counters 1203 mounted on the front surfaces of the frontward detectors 1201 and front-inner counters 1205 mounted on the front surfaces of the rearward detectors 1202. The counters may further include back-outer counters 1206 mounted on the back surfaces of the rearward detectors 1202 and back-inner counters 1208 mounted on the back surfaces of the frontward detectors 1201. The counters may further include front-parallel counters 1204 mounted on the sides of the frontward detectors 1201 and back-parallel counters 1207 mounted on the sides of the rearward detectors 1202. Finally, the counters may include endmost counters 1209 mounted on the outside surfaces of the endmost detectors 1201 or 1202. Thus, the various counters 1203-1209 may nearly surround the detectors 1201-1202 as depicted in FIG. 12.

For simplicity in the following examples, a source will be assumed to be in front, and the parallel-type counters 1204 and 1207 will be ignored, and the endmost counters 1209 will be ignored, and the back counters such as 1206 and 1208 will be ignored. Thus, in the examples it will be sufficient to consider only the detectors 1201-1202 and the inner and outer front counters 1203 and 1205. With the source in the front, the frontward detectors 1201 are of the protruding type and the rearward detectors 1202 are of the recessed type, relative to that source. Likewise, the front-outer counters 1203 are protruding toward the source, and the front-inner counters 1205 are recessed.

In some embodiments, each counter may be substantially thinner than the detector thickness, thereby to avoid blocking particles from reaching the frontward or rearward detectors 1201-1202. For example, the counter thickness may be in the range of 1-10 mm while the detector thickness may be 10-20 cm, according to some embodiments. The counter thickness may be related to the detector thickness, such as about 1-2% of the detector thickness to avoid blocking the detectors 1201-1202, or 5% of the detector thickness, or 10% of the detector thickness for improved detection efficiency in the counters.

In some embodiments, the counters 1203-1209 may be configured to detect different particle types than the detectors 1201-1202. For example, counters of LYSO scintillator can detect gamma rays, while detectors of ZnS-based scintillator can detect neutrons. The neutrons easily pass through the LYSO counters, and the ZnS detectors 1201-1202 are nearly gamma-blind. Therefore, the detectors 1201-1202 detect neutrons exclusively, while the counters 1203-11209 detect gammas exclusively.

Alternatively, the counters 1203-1209 may be configured to detect neutrons while the detectors 1201-1202 may be configured to detect gamma rays. For example, the counters 1203-1209 may be acrylic loaded with microbeads of $CaF_2$ scintillator containing Li or B converters to detect low-energy neutrons by capture, while the detectors 1201-1202 may be liquid scintillator which may be contained within the acrylic structure to detect gammas by Compton scattering. A single light sensor such as a photomultiplier tube may view both scintillators at the same time, with signal separation by pulse-shape analysis to separate the 5 ns pulses of the organic scintillator detectors 1201-1202 from the 900 ns inorganic pulses of the counters 1203-1209 in this example.

In some embodiments, the counters and detectors may be configured to detect the same types of particles but with different energies. For such dual-energy detection of neutrons, for example, the counters 1203-1209 may be planar semiconductors with a thin LiF converter layer to detect thermal neutrons, while the detectors 1201-1202 may be PMMA loaded with microbead scintillator (without Li or B converters) to detect high energy neutrons by proton recoil. The high energy neutrons pass through the thin counters with no effect, and the low energy neutrons tend not to interact with the detectors since there are no nuclides with high absorption cross-sections.

Alternatively, to detect two different energies of gamma rays, the counters may be $CdWO_4$ configured to detect 100-200 keV gamma rays by photoelectric absorption, while the detectors may be plastic scintillator configured to detect 1 MeV gamma rays by Compton scattering. In each case, the counters 1203-1209 can detect a low-energy component of a particle type while the detectors 1201-1202 can detect the high-energy component. This may be valuable for diagnosing a shielded weapon since the shielding often converts the initially high-energy particles to lower energy particles by scattering.

In some embodiments, the detectors 1201-1202 and the counters 1203-1209 may localize the same source using the two different sets of particles, or they may detect and localize two different sources at the same time. For example, the counters 1205 may be configured to detect thermal neutrons while the detectors 1201-1202 may detect high-energy gammas. In an inspection environment, a shielded neutron source may be present in front of the detector array, and an unshielded benign gamma source may be present in back of the detector array. The frontward detectors 1201, which are recessed as viewed from the back, detect the gamma source and exhibit a narrow detection peak in the frontward detectors 1201, thereby detecting the gamma source as well as localizing it in back. At the same time, the front-recessed counters 1205 detect low-energy neutrons from the shielded neutron source in front, and they exhibit a narrow detection peak due to the collimating effect of the front-parallel counters 1204 and the front-protruding counters 1203. Thus, the detector array can detect and localize both a shielded neutron source in front and a benign gamma source in back simultaneously.

In some embodiments, the counters 1203-1209 may reveal a source that the detectors 1201-1202 may miss. For example, a well-shielded uranium bomb may emit only 100-200 keV photons which may be too low in energy for PVT-based detectors 1201-1202 to detect, but are easily picked up by a set of bright high-density LYSO counters. At an inspection site, the counters 1203-1209 may provide a continuous measure of the natural background radiation such as epithermal neutrons from atmospheric cosmic ray interactions, while the detectors 1201-1202 continuously search for high-energy particles from nuclear weapon materials.

In some embodiments, the counters 1203-1209 may be read out separately from the detectors 1201-1202, in which case the counters 1203-1209 may provide two separate measures of the background flux impinging from the front and from the back. More specifically, the detection rates in the front-outer counters 1203 may measure the background rate in front of the detector array while the back-outer counters 1208 may measure the backgrounds on the back. This may be useful in an inspection site to inspect vehicles and cargo containers, where any increase in the background rates in the direction of an inspection item may be a cause for alarm.

Also shown are two exemplary embodiments of embedded detectors 1218 and 1219 which may be contained within or embedded in the detectors 1201 and 1202. Each embedded detector 1218 and 1219 may include a detection material configured to detect different particle types and/or different energy ranges relative to the detectors 1201 and 1202. The embedded detectors 1218 and 1219 may be of any shape, such as a planar shape 1218 as shown, or a cylindrical shape 1219 as viewed from the top. Each detector 1201 and 1202 may contain one embedded detector 1218-1219 or multiple embedded detectors 1218-1219.

In a particular embodiment, the detectors 1201 and 1202 may include hydrogenous scintillator such as plastic or liquid scintillator configured to detect gamma rays as well as recoil protons in the hydrogenous scintillator. The hydrogenous scintillator may also moderate or slow down neutrons by scattering. The embedded detectors 1218-1219 may include a neutron-specific scintillator such as a ZnS—LiF blend in a transparent PMMA matrix with a wavelength shifter, and may be configured to detect energetic ions emitted by neutron-capture reactions. The detectors 1201-1202 may then detect and localize gamma ray sources, and may moderate or thermalize incoming fast neutrons, and the embedded detectors 1218-1219 may detect those neutrons and thereby detect the presence of neutron sources. Thus the system may indicate the location of the source using gamma rays and may also indicate whether the source also emits neutrons, a valuable piece of information for an inspector. If the detectors 1201-1202 produce different signals from the embedded detectors 1218-1219, both may be viewed by a shared light sensor. Alternatively, separate light sensors may view the detectors 1201-1202 and the embedded detectors 1218-1219 separately. The detectors 1201-1202 may be configured to emit a first signal upon detecting a recoil proton, and a second signal different from the first signal upon detecting the ions from a neutron capture event. The processor may be further configured to determine that a fast neutron has been detected when the hydrogenous scintillator emits a first pulse of light, and then within a period of 1 to 50 microseconds, the neutron-sensitive scintillator emits a second light pulse. This sequence indicates that a fast neutron has entered the hydrogenous scintillator, scattered one or multiple times from the hydrogen nuclei (thereby launching recoil protons into the hydrogenous scintillator) and then the neutron was captured in nuclides comprising or proximate to the neutron-specific scintillator (thereby launching one or more energetic ions which can be detected in the neutron-specific scintillator). In this way the configuration can localize the source using the gamma ray signals, and also indicate whether the source also emits neutrons.

Figure 12A:
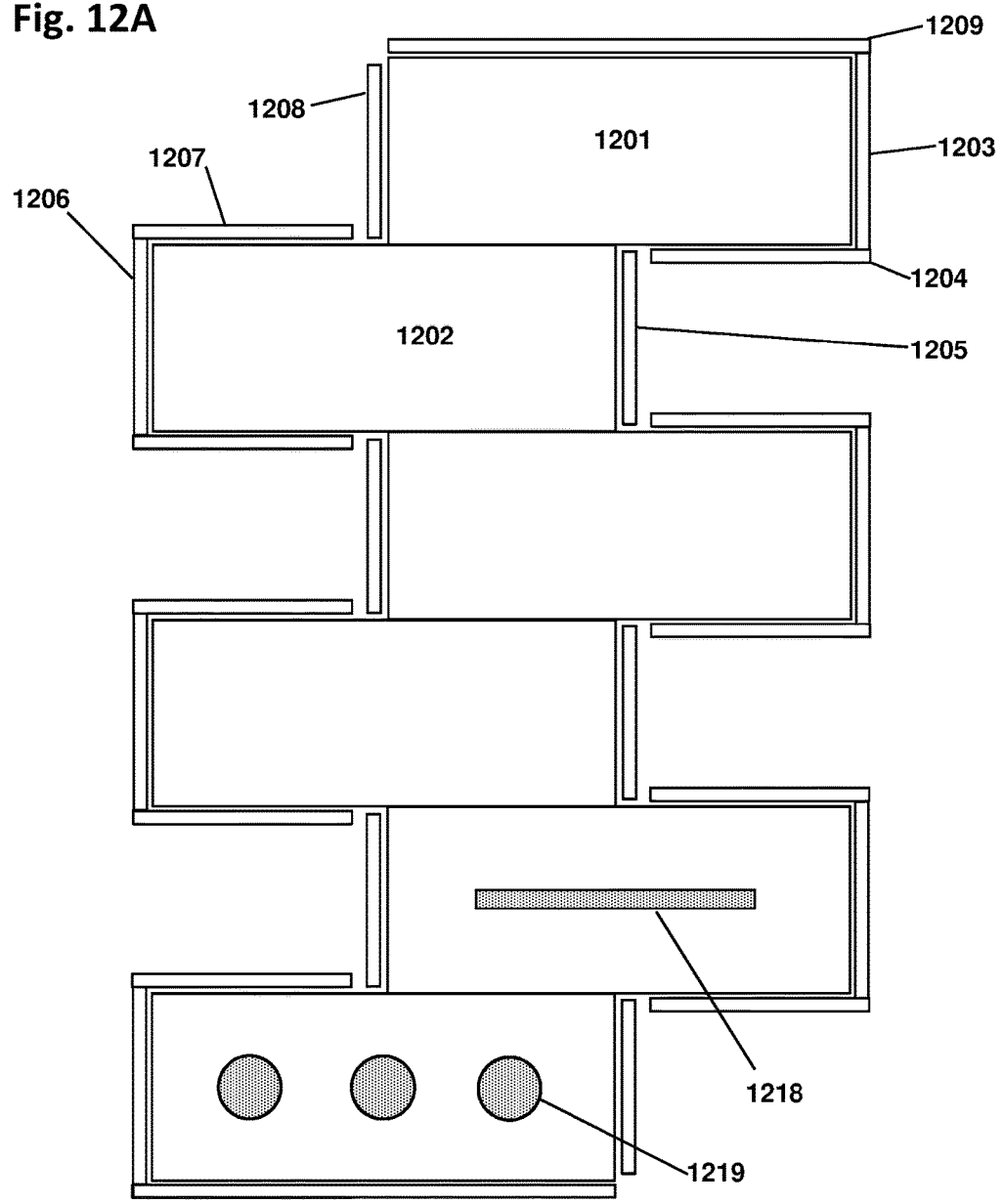
FIG. 12A is a cross-section sketch of a detector array including thin counters mounted peripherally to detect different particles according to some embodiments.
Figure 12B:
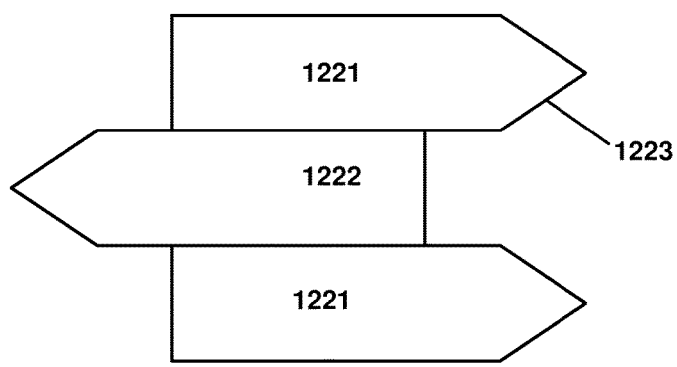
FIG. 12B is a cross-section sketch of a detector array with pointed detectors according to some embodiments.

FIG. 12B is a top-view cross-section sketch of an exemplary portion of a detector array including frontward 1221 and rearward 1222 detectors. Each detector 1221-1222 may include a point-shaped surface. Specifically, the front surface of each frontward detector 1221 may be shaped as a point 1223, and likewise the back surface of each rearward detector 1222 may be shaped as a point. Configuring the surfaces of the detectors 1221-1222 in this way may improve the detection peak determination by admitting particles from some directions and blocking particles from other directions according to the point shape 1223.

Figure 12C:
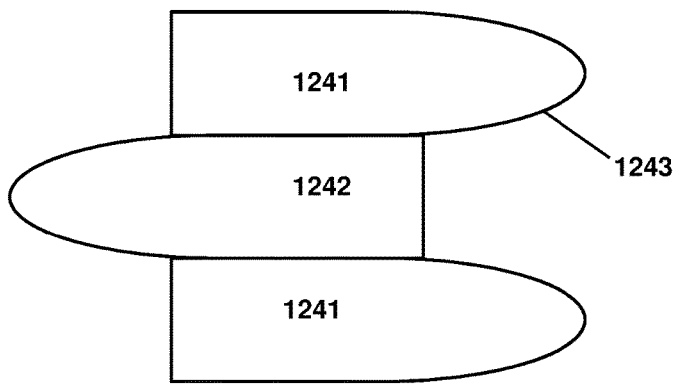
FIG. 12C is a cross-section sketch of a detector array with rounded detectors according to some embodiments.

FIG. 12C is a top-view cross-section sketch of an exemplary portion of a detector array including frontward 1241 and rearward 1242 detectors that each include a parabolic or bullet-shaped convex rounded surface 1243. Specifically, the front surface 1243 of each frontward detector 1241 and the back surface of each rearward detector 1242 may be configured in such a parabolic convex rounded shape. When so configured, the detectors 1241-1242 may further adjust the detection peak for improved analysis.

Figure 12D:
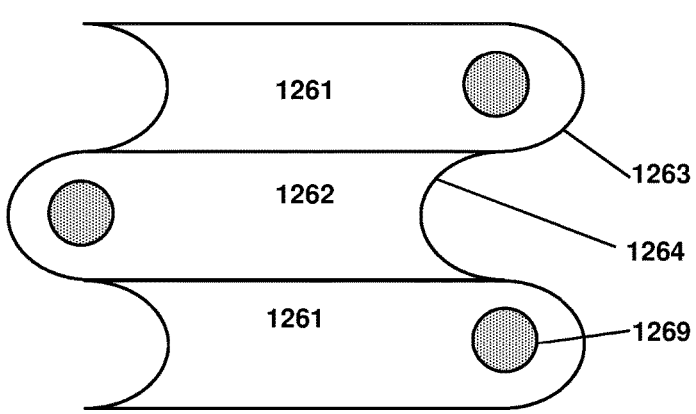
FIG. 12D is a cross-section sketch of a detector array with convex and concave detectors according to some embodiments.

FIG. 12D is a top-view cross-section sketch of an exemplary portion of a detector array including frontward 1261 and rearward 1262 detectors that include a semi-cylindrical convex shape 1263 and a semi-cylindrical concave shape 1264. Specifically, the front surface of each frontward detector 1261 and the back surface of each rearward detector 1262 includes a convex shape 1263, and the front surface of each rearward detector 1262 and the back surface of each frontward detector 1261 includes a concave shape 1264. These rounded convex and concave shapes 1263-1264 may further adjust and sharpen the detection peak by blocking or detecting particles from various directions.

In addition, the figure shows an embedded detector 1269 inside each detector 1261-1262. Each embedded detector 1269 may be configured to detect a different particle type or different energy range than the detectors 1261-1262. For example, the embedded detectors 1269 may include ZnS—LiF to detect neutrons, while the surrounding detectors 1261-1262 may include plastic scintillator for gamma ray detection. The plastic scintillator, which includes hydrogen, may further improve the neutron detection of the embedded detectors 1269 by moderating any incoming neutrons.

Alternatively, the detectors 1261-1262 may be configured to detect neutrons using microbead scintillators that only minimally respond to gamma-generated electrons, while the embedded detectors 1269 may include neutron-blind gamma ray scintillator such as BGO. As a third option, the embedded detectors 1269 may include PSD scintillator such as CsI or elpasolite for simultaneous separate detection of neutrons and gamma rays.

Figure 13A:
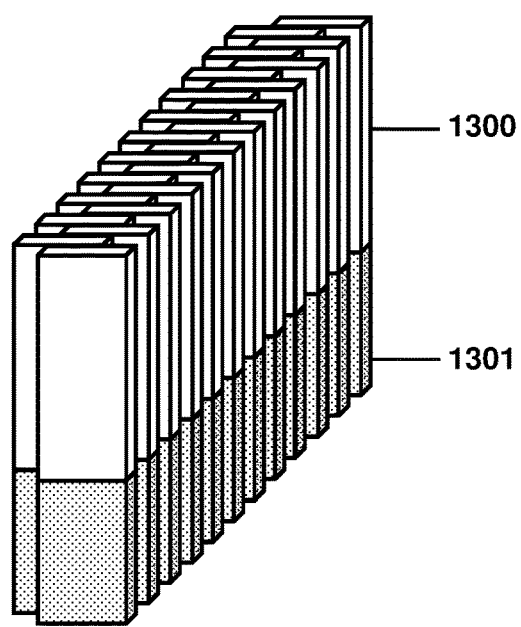
FIG. 13A is a sketch in perspective showing an exemplary assembly of two detector arrays according to some embodiments.

FIG. 13A is a perspective sketch of an exemplary assembly including two detector arrays 1300 and 1301 stacked vertically. In some embodiments, the two arrays 1300 and 1301 may be configured to detect different particle types, for example the upper detector array 1300 may be configured to detect gamma rays exclusively, and the lower detector array 1301 may be configured to detect neutrons exclusively. Such an assembly can thereby detect and locate a gamma ray source and a neutron source simultaneously.

Alternatively, in some embodiments the upper and lower detector arrays 1300 and 1301 may be configured to detect the same particle type but with different energy ranges. For example, the upper detector array 1300 may be configured to detect high energy neutrons by proton recoil, and the lower detector array 1301 may be configured to detect low energy neutrons by neutron capture. Such an assembly can thereby detect low energy neutron backgrounds and high energy neutron threat sources simultaneously. As a further alternative, the upper detector array 1300 may be configured to detect high energy gamma rays (>1 MeV) by Compton scattering, while the lower detector array 1301 may be configured to detect low energy gamma rays (100-500 keV) by photoelectric absorption.

Figure 13B:
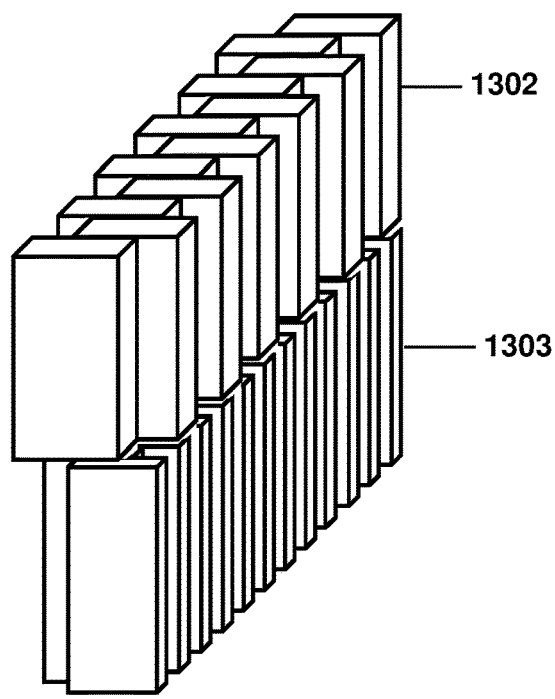
FIG. 13B is a sketch in perspective showing an exemplary assembly of two detector arrays of different designs according to some embodiments.

FIG. 13B is a perspective sketch of an exemplary assembly including two detector arrays 1302 and 1303 stacked vertically, wherein the two detector arrays 1302 and 1303 have different detector thicknesses and different recess distances, among other differences. For example, in some embodiments, the lower detector array 1303 may include an inorganic scintillator such as BGO to detect gamma rays. Due to the relatively short average interaction distance of gammas in the high-density BGO, the lower detector array may be optimally configured with a small detector thickness such as 2 cm. The upper detector array 1302 may include PMMA with ZnS to detect high energy neutrons for example, with a relatively long interaction distance and therefore a larger detector thickness of 12 cm in this example. The assembly can thereby detect gamma rays and neutrons efficiently using different thicknesses and other design parameters optimized for each of the detector arrays 1302 and 1303 separately.

Figure 14:
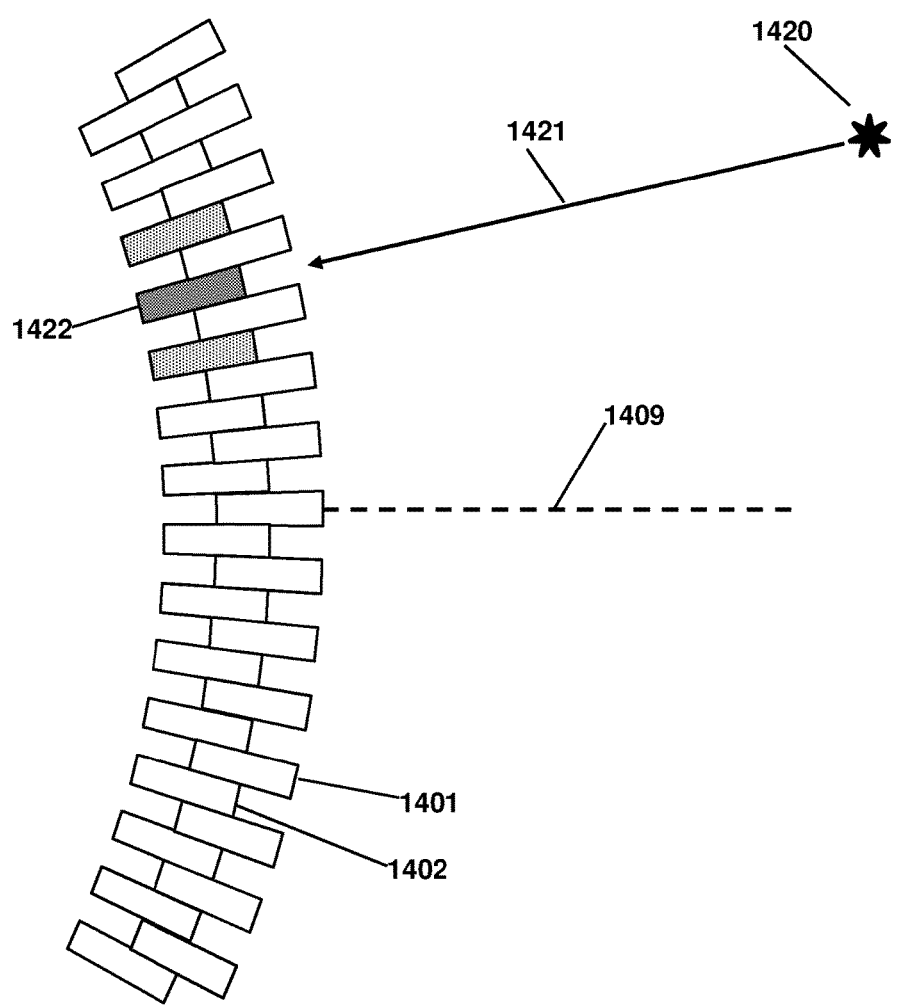
FIG. 14 is a sketch in cross-section of an exemplary detector array in which the detectors are arranged around an arcuate shape according to some embodiments.

FIG. 14 is a top-view cross-section sketch depicting an exemplary detector array with an overall arc shape as viewed from the top, rather than an overall planar shape as in the previous examples. The detectors are shown alternating in position radially, thereby forming protruding detectors 1401 interleaved with recessed detectors 1402 (as viewed by a source 1420 in the front) according to some embodiments. "Front" here is the region facing the convex side and is to the right in the sketch. The aiming plane 1409, shown as a dash line in this top view, is a plane parallel to the major faces of the central detector and parallel to the height direction, while all the other detectors are successively rotated relative to the aiming plane 1409 according to the overall arc shape. Thus for an arc-shaped detector array, the lateral direction is the direction perpendicular to the central detector in the array, while the other detectors may be oriented at successively larger angles relative to the aiming plane according to the arc shape. If the detectors are slab-shaped with their major faces parallel, then a small triangular or trapezoidal space may be provided between adjacent detectors to accommodate the various orientations of the detectors. Alternatively, the detectors may be configured as nearly slab-shaped but with slightly tilted or non-parallel major faces according the arc shape, in which case the detectors may be positioned with their major faces parallel and/or substantially in contact. The aiming plane 1409 in that case is a symmetrically central plane in the arc-shaped detector array, and the lateral direction is the direction perpendicular to the aiming plane 1409. A source 1420 in the front area emits particles 1421 which are detected in the detectors 1401 and 1402. The particular recessed detector 1422 which is aligned with the source 1420 registers a high detection rate, and thus is shown in dark stipple. Its neighboring recessed detectors are partially obscured or collimated by the protruding detectors 1401 and thus register lower detection rates. The protruding detectors 1401 also detect the particles 1421, but have a wide detection distribution based on their geometrical exposure area toward the source 1420 without collimation. The detector array can unambiguously determine whether the source 1420 is in front or back of the detector array according to whether the narrow detection peak 1422 is in the protruding 1401 or recessed 1402 detectors. The detector array can also determine the source angle relative to the aiming plane 1409 according to which recessed detector 1402 has the highest detection rate.

In some embodiments, the arc-shaped detector array can detect sources located behind the detector array as well as in front. If a source is behind the detector array, that is toward the concave side, the detector array can determine the angle of each source according to the distribution of detections, as discussed.

In contrast to detector arrays having an overall planar shape, the arc-shaped version does not provide a determination of the longitudinal distance to the source on the basis of the detection peak width. The detection peak width in the arcuate version is primarily determined by the radius of curvature of the arc, not by the source distance. On the other hand, the arcuate version has a much wider field of view than the flat version and thus can accurately localize sources across a larger region.

Figure 15:
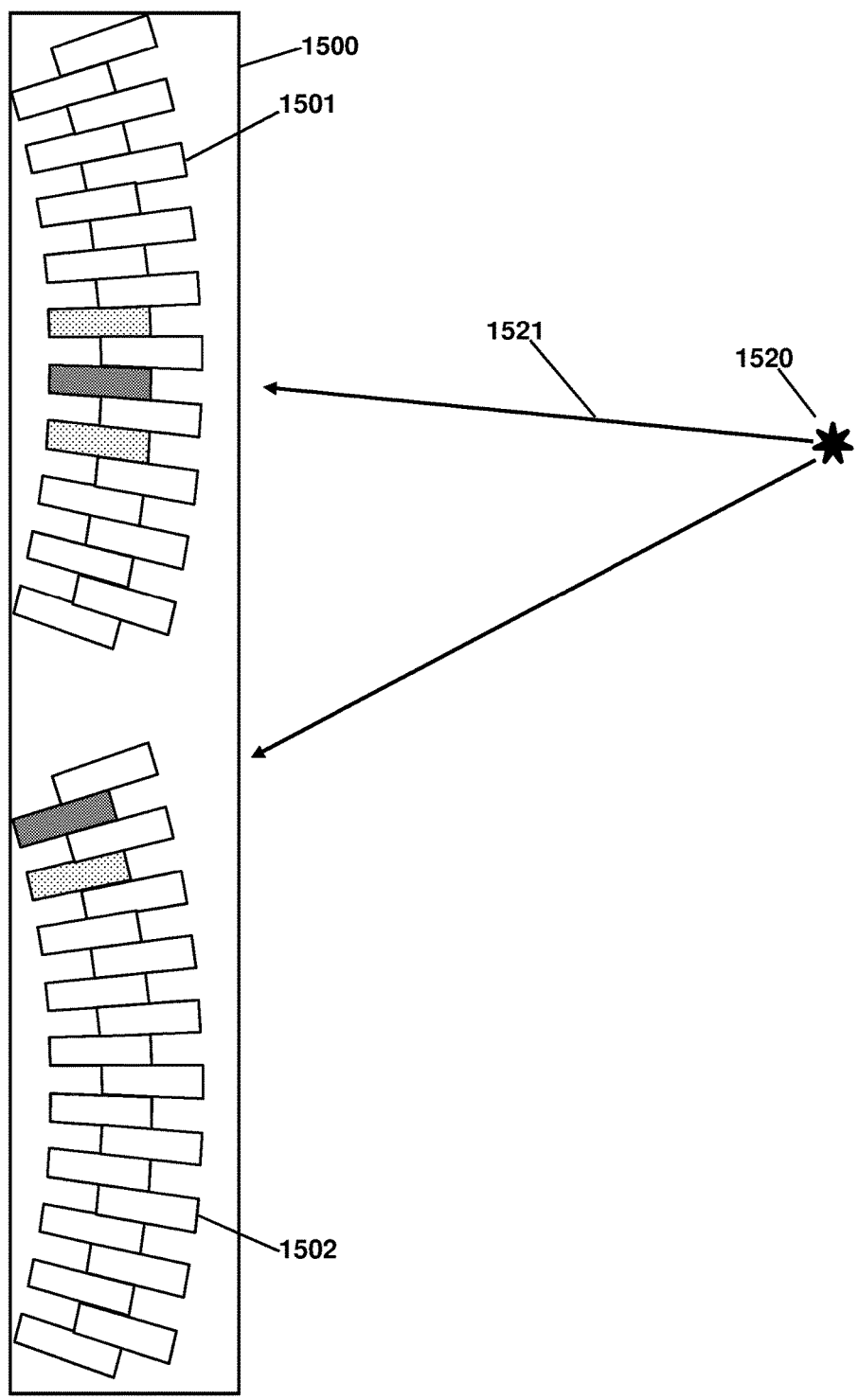
FIG. 15 is a sketch in cross section of an exemplary mobile scanner including two arcuate detector arrays to determine the distance of a source according to some embodiments.

FIG. 15 is a top-view cross-section sketch of an exemplary mobile scanner or a vehicle/cargo inspection station including a pair (two) detector arrays 1501 and 1502 spaced apart laterally, each having an overall arc shape, mounted in an enclosure 1500 according to some embodiments. Both detector arrays 1501 and 1502 can detect particles 1521 from a source 1520, however, each of the detector arrays 1501 and 1502 has a different detection peak position according to which of the recessed detectors is aligned with the source 1520. Thus, the peak position in each detector array 1501 and 1502 can indicate the source angle from a different viewpoint. The difference in the peak positions in the two detector arrays 1501 and 1502 can thereby measure of the distance to the source 1520 by triangulation. In some embodiments, such a dual-arc configuration can simultaneously provide a high angular field of view, front-versus-back determination of the source position, and a separate determination of the source distance. These capabilities may be especially useful for mobile scanners searching for hidden weapons in an area.

Figure 16:
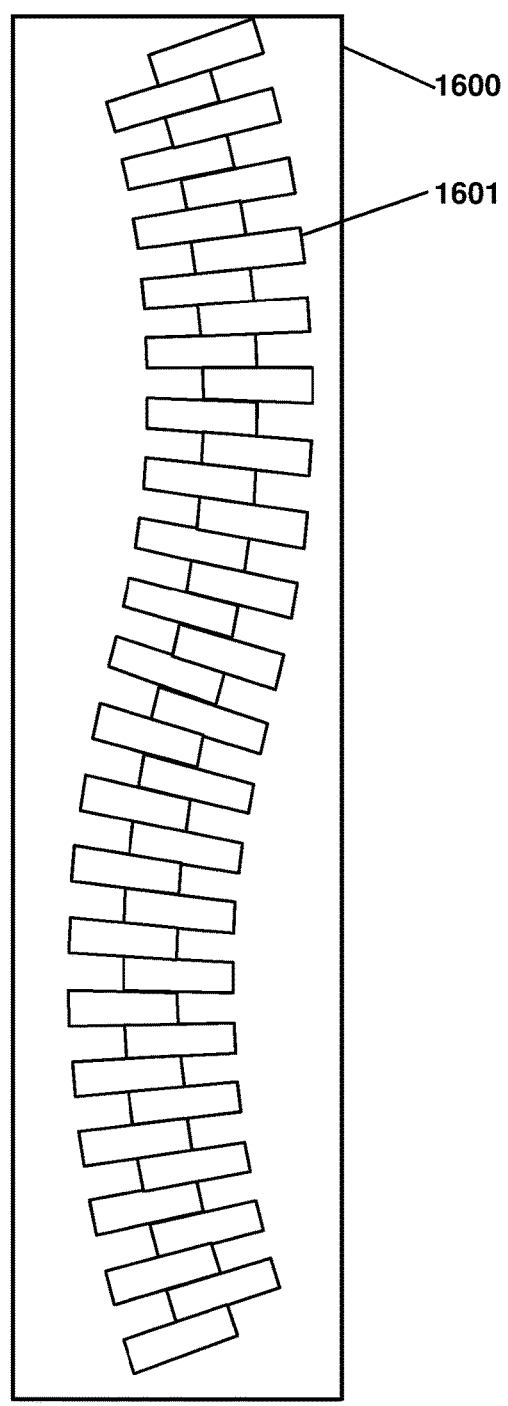
FIG. 16 is a sketch in cross-section of an exemplary mobile scanner including an arcuate detector array that bends in both directions according to some embodiments.

FIG. 16 is a top-view cross-section sketch of an alternative embodiment 1600 wherein the detector array 1601 has an overall shape as a compound arc or an "S-shape", wherein the detector array includes curvature in both frontward and rearward directions. As discussed in FIG. 15, the two regions of the S-shaped detector array 1601 can determine the source angle, source distance, and the front-versus-back region of the source according to the detection peaks in the detector array 1601. In some embodiments, the enclosure 1600 may be configured to block less than 10% of the particles incident orthogonally thereon. For example, if the detector array 1601 is configured to detect gamma rays, the enclosure 1600 may include plastic which has low attenuation for gamma rays. If the detector array 1601 is configured to detect neutrons, the enclosure 1600 may include steel which readily passes neutrons. If the detector array 1601 is configured to detect both gamma rays and neutrons, the enclosure 1600 may include aluminum or a carbon-carbon composite material, either of which can be configured to pass most or almost all of the incident particles.

Figure 17:
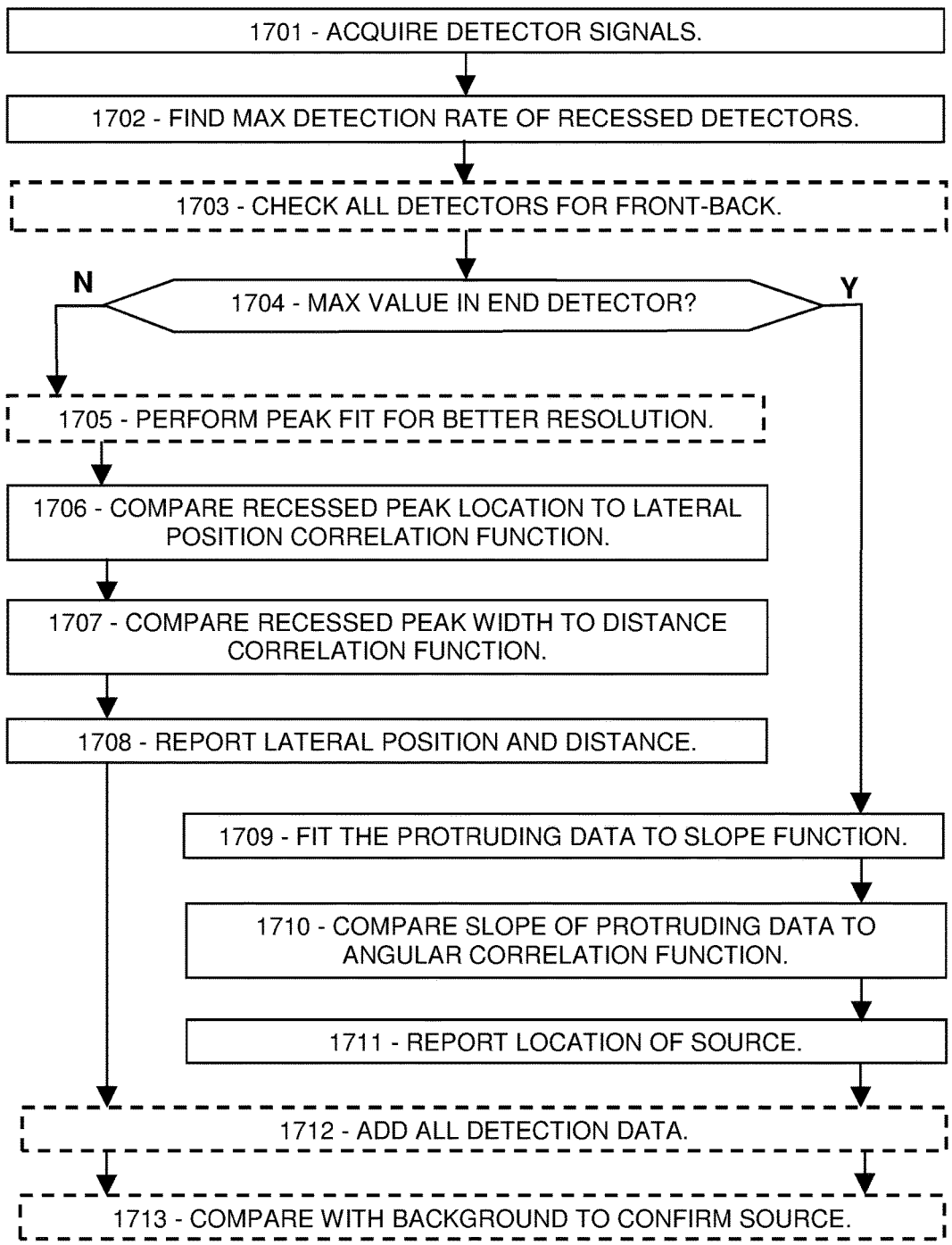
FIG. 17 is a flowchart showing steps of an exemplary method for calculating the lateral position, distance, and angle of the source according to some embodiments.

FIG. 17 is a flowchart showing an exemplary method for determining source parameters from detection data, according to some embodiments. First 1701, detection signals may be acquired for a period of time from all the detectors including the recessed and protruding detectors. Then 1702, the particular recessed detector that has the highest detection rate may be identified. Then 1703, optionally (in dash) the peak amplitudes and peak shapes in the recessed and protruding detectors may be compared, thereby determining whether the source is in front or in back of the detector array.

The detection distribution in the detectors may then be checked to determine if the highest value is in one of the end detectors or appears internally among the detectors 1704. If the highest-counting detector is not an end detector (that is, the maximum detection is somewhere internal among the detectors), then the source is known to be within the field of view of the recessed detectors. In that case, the lateral position and the distance of the source can be determined from the recessed detection peak position and its width. Then 1705, optionally, the detection peak may be fit to a shape function, so as to more precisely determine the centroid or width or curvature of the detection peak. Alternatively, the fitting operation may be skipped, in which case the lateral position of the highest-counting recessed detector may be used as the detection peak location.

Then 1706, with or without peak fitting, the detection peak location may be compared to a predetermined lateral position correlation function that relates the lateral position of the source to the detection peak location, from which the lateral position of the source is directly determined. Then 1707 the detection peak width or curvature may be determined, based on a fit such as a parabolic fit, or based on the full width at half-maximum, or using an empirical peak curvature criterion, or other measure of the detection peak width. The detection peak width may then be compared to a predetermined peak-width correlation function that relates the distance of the source to the width of the detection peak, from which the source distance may be directly obtained. Then 1708, or at a later time, the detector array may report the source lateral position and distance as determined from the recessed detector data.

Returning to step 1704, if the maximum detector rate is in one of the endmost detectors, then the source is apparently positioned beyond the end of the detector array, in which case the angle of the source may be determined 1709 by fitting the distribution of detections in the protruding detectors to a slope function. Then 1710, the slope may be compared to a predetermined slope correlation function that relates the source angle to the slope, and thereby determines the source angle. Then 1711 the detector array can report the source location parameters so determined.

Optionally, the detection data can be used to provide a highly sensitive determination of the presence or absence of a source within range of the detector array regardless of the source angle. To do so, all of the detection data in the recessed and protruding detectors may be added together 1712, thereby effectively treating the entire array as a single huge detector. Then 1713, the total detection rate may be compared to a normal or expected background value, thereby determining that a source is present if the total detection exceeds the expected value substantially, such as exceeding by 1 or 2 or 3 times the statistical variation in the number of detections observed.

Embodiments of the detector array described herein can provide many advantages over conventional detectors and can economically solve important security inspection problems. (a) The detector array can detect a source with high sensitivity, due to its large area and high intrinsic efficiency and absence of shields or external collimators, according to some embodiments. (b) The detector array can determine the front-versus-back position of the source and/or the lateral position of the source and/or distance of the source and/or angle of the source, according to some embodiments. (c) The detector array can scan trucks, cargo containers, railcars, airplanes, vans, cars, boats, and many other vehicles, and can localize any nuclear materials and/or radiological weapons found, according to some embodiments. (d) The detector array can detect and localize sources both in front and behind the detector array, according to some embodiments. (e) The detector array can scan two vehicles or other inspection items simultaneously, while identifying which vehicle has a radioactive source, according to some embodiments. (d) The detector array can detect and localize a plurality of radioactive sources simultaneously, according to some embodiments. (e) The detector array can be combined with a cosmic ray scattering inspection system, thereby providing two contrasting detection modes for revealing nuclear materials, according to some embodiments. (f) The detector array can scan across a wide area and detect nuclear weapons in regions such as an urban environment, according to some embodiments. (g) The detector array can perform an extremely sensitive scan of shipping containers in longer, high-statistics scan periods, thereby detecting even a well-shielded weapon or portions thereof, according to some embodiments. (h) The detector array can be assembled from available detector types including gamma-blind neutron scintillators, neutron-blind gamma scintillators, ionization-dependent scintillators that separately detect both particles, and low-cost liquid scintillators, according to some embodiments.

The ability to localize a clandestine radioactive source rapidly is a key enabling factor in nuclear threat detection. Advanced radiation detection systems like those disclosed herein will be needed in the coming decades to protect innocent people from the threat of nuclear and radiological terrorism.

The embodiments and examples provided herein illustrate the principles of the invention and its practical application, thereby enabling one of ordinary skill in the art to best utilize the invention. Many other variations and modifications and other uses will become apparent to those skilled in the art, without departing from the scope of the invention, which is defined by the appended claims.

What is claimed is:

1. A detector array for locating a radioactive source, comprising:
    at least ten slab-shaped detectors configured to detect particles from the radioactive source, each detector being positioned parallel to an aiming plane that runs centrally from the back to the front of the detector array, wherein the detectors are stacked face-to-face and arranged in an alternating sequence of frontward and rearward detectors, and wherein each rearward detector is offset from one or more adjacent frontward detectors by a distance at least equal to the thickness of each of the detectors; and
    a processor configured to be communicatively coupled to each detector respectively, and to determine whether a source is present by calculating a sum of detection data from all of the detectors and comparing the sum to a predetermined background value.

2. The detector array of claim 1, wherein the thickness of each detector is at least equal to the average interaction distance of the particles therein.

3. The detector array of claim 1, wherein the processor is configured to compare a frontward peak associated with the frontward detectors with a rearward detection peak associated with the rearward detectors.

4. The detector array of claim 3, wherein the processor is further configured to determine the width of the frontward detection peak and the width of the rearward detection peak.

5. The detector array of claim 3, wherein the processor is further configured to determine a curvature of the frontward detection peak and a curvature of the rearward detection peak.

6. The detector array of claim 5, wherein the processor is further configured to determine a front-versus-back position of the radioactive source by comparing the curvature of the frontward detection peak with the curvature of the rearward detection peak.

7. The detector array of claim 5, wherein the processor is further configured to determine the distance of the radioactive source from the detector array by applying a predetermined correlation function that relates the curvature of the frontward or rearward detection peak to the distance of the radioactive source.

8. The detector array of claim 3, wherein the processor is further configured to determine the lateral position of the radioactive source according to the lateral position of the frontward or rearward detection peak.

9. The detector array of claim 3, wherein the processor is further configured to determine an angle toward the radioactive source according to a slope of detection data in the frontward or rearward detectors.

10. The detector array of claim 1, wherein each detector includes a first portion and a second portion, the first portion being configured to detect a first particle type, and the second portion being configured to detect a second particle type different from the first particle type.

11. The detector array of claim 1, wherein each detector includes a first portion and a second portion, the first portion being configured to detect particles in a first energy range, and the second portion being configured to detect particles in a second energy range different from the first energy range.

12. The detector array of claim 1, further including an upper tracking chamber and a lower tracking chamber, each tracking chamber being configured to measure a track of a cosmic ray.

13. The detector array of claim 12, wherein the upper and lower tracking chambers are configured to inspect a vehicle in a tracking chamber field of view, and the detector array is configured to inspect the same vehicle simultaneously.

14. The detector array of claim 13, wherein the detector array is positioned outside the tracking chamber field of view.

15. The detector array of claim 13, wherein the detector array is positioned below the lower tracking chamber.

16. The detector array of claim 1, wherein the detector array is mounted inside a vehicle.

17. The detector array of claim 16, wherein the detector array is configured to acquire detection data while the vehicle is in motion.

18. The detector array of claim 17, further including a processor configured to record detection data, location data, and bearing data while the vehicle is in motion.

19. The detector array of claim 1, wherein the detector array is configured to simultaneously inspect a first inspection object positioned in front of the detector array and a second inspection object positioned behind the detector array.

* * * * *